United States Patent [19]

Beach

[11] Patent Number: 5,557,934
[45] Date of Patent: Sep. 24, 1996

[54] EFFICIENT ENERGY CONVERSION APPARATUS AND METHOD ESPECIALLY ARRANGED TO EMPLOY A STIRLING ENGINE OR ALTERNATELY ARRANGED TO EMPLOY AN INTERNAL COMBUSTION ENGINE

[75] Inventor: Eugene H. Beach, Silver Spring, Md.

[73] Assignee: Epoch Engineering, Inc., Gaithersburg, Md.

[21] Appl. No.: 360,053

[22] Filed: Dec. 20, 1994

[51] Int. Cl.$^6$ ..................................... F01B 9/00
[52] U.S. Cl. ............... 60/517; 123/197.4; 123/48 B; 92/140
[58] Field of Search ............... 60/517, 525; 123/197.4, 123/48 B; 92/140

[56] References Cited

U.S. PATENT DOCUMENTS

| | | | |
|---|---|---|---|
| 2,877,755 | 3/1959 | Danilewicz | 123/197.4 |
| 3,319,416 | 5/1967 | Renshaw | 60/525 |
| 4,195,482 | 4/1980 | Moloney | 60/517 |
| 4,387,566 | 6/1983 | Berchowitz | 60/518 |
| 4,389,844 | 6/1983 | Ackermann et al. | 60/517 |
| 4,395,880 | 8/1983 | Berchowitz | 60/518 |
| 4,478,553 | 10/1984 | Leibowitz et al. | 416/47 R |
| 4,522,030 | 6/1985 | Corey | 60/525 |
| 4,545,341 | 10/1985 | Corey et al. | 123/192.2 |
| 4,633,668 | 1/1987 | Corey | 60/526 |
| 4,765,138 | 8/1988 | Corey | 60/517 |
| 4,803,964 | 2/1989 | Kurek et al. | 123/197.4 |
| 5,095,700 | 3/1992 | Bolger | 60/517 |
| 5,170,757 | 12/1992 | Gamache | 123/197.4 |
| 5,301,764 | 4/1994 | Gardner | 182/65.2 |

FOREIGN PATENT DOCUMENTS

| | | | |
|---|---|---|---|
| 5-086892 | 4/1993 | Japan | 123/197.4 |

OTHER PUBLICATIONS

R. J. Meijer, "The Evolution of the Stirling Engine", Zed., Stirling Thermal Motors, Inc., Jul. 1987.

*Primary Examiner*—Leonard E. Heyman
*Attorney, Agent, or Firm*—Finnegan, Henderson, Farabow, Garrett & Dunner, L.L.P.

[57] ABSTRACT

A stirling engine or an internal combustion engine having one or more cylinders, each having a moveable piston which is coupled to a drive shaft to drive a load. The engine load coupling also includes a set of Class 1 elliptical gears of the first type which means each gear rotates about one of its focal points. The load and the engine are efficiently operated as a result of the operation of the coupling arrangement. In apparatus employing a Stirling engine, apparatus and engine efficiencies are enhanced through elliptical gear operation which enables the Stirling engine to operate very closely to the idealized Stirling cycle.

31 Claims, 27 Drawing Sheets

EFFICIENT ENERGY CONVERSION APPARATUS AND METHOD ESPECIALLY ARRANGED TO EMPLOY A STIRLING ENGINE OR ALTERNATELY ARRANGED TO EMPLOY AN INTERNAL COMBUSTION ENGINE

BACKGROUND OF THE INVENTION

The present invention relates to energy conversion apparatus and especially to Stirling engines which are structured to operate with substantially increased efficiency to enable them to be widely applicable for general commercial purposes and further to internal combustion engines which are structured to operate with increased efficiency and reduced pollution.

The Stirling engine was first developed early in the Nineteenth Century. It is a closed cycle air engine that employs a regenerator to reuse heat that would otherwise be wasted. Early Stirling engines were characterized with metallurgical problems, especially since the structural materials available at the time were not well suited to the continuously high temperatures at which hot parts of the engine were operated. Competing steam engines operated at lower temperatures and thus had no need for materials capable of operating at the high operating temperatures of Stirling engines.

The early Stirling engines were used for a wide variety of purposes, but limited power generating capability and limited reliability restricted the Stirling engine in its commercial applications and usage. On the other hand, inducements did exist for use of Stirling engines because of their quiet operation, because of their capability for using a wide variety of fuels, and because of their greater appropriateness for certain uses for which steam engines were unsuitable.

With the development of the electric motor and the gasoline engine as load drives, usage of the Stirling engine declined since the new load drives provided greater power with reduced engine size and, in general, operated with greater efficiency. By the early part of the Twentieth Century, Stirling engines existed essentially only as models of the past.

Nonetheless, around the middle of the Twentieth Century, development activity was continued on the Stirling engine concept, especially for communications and vehicular applications. Development incentives generally arose from the availability of stainless steel and other materials capable of operating at high temperatures, and from the promise of success based on a gap that then existed between theoretical Stirling cycle efficiency and the actual efficiency of existing Stirling engines.

As a result of early development efforts primarily for power generation in communication applications, improvements were made in ratios of engine power to engine weight and engine power to engine size. Stirling engines could be made with operating speeds in excess of 3000 revolutions per minute (rpm) and with power generating capabilities up to and in excess of 25 horsepower.

Smaller Stirling engines tended to employ Stirling's original piston-displacer design, whereas the larger Stirling engines tended to employ a double acting design called a Rinia engine. Both designs employed pressurized air as a closed cycle working gas. However, sealing problems were experienced with the Rinia engine design.

A twin crankshaft drive called a rhombic drive then became available to reduce concentric push-rod sealing problems and to enable use of the original Stirling piston-displacer arrangement without a large pressurized crankcase. As a result, participation of the automotive industry in Stirling engine development increased significantly. Higher powered Stirling engines were developed with much higher working gas pressures and with energy conversion efficiencies as good as or better than those of the gasoline and diesel internal combustion engines. Small Stirling engines were developed with operating speeds as high as 5000 rpm.

More recently, further interest in Stirling engine development arose from concerns about automotive emissions and increasing oil prices caused by monopolistic oil pricing practices. The Stirling engine is essentially an environmentally clean engine, and, as previously noted, has a capability for using a wide variety of fuels which could lead to substantially reduced use of petroleum products in favor of cost-effective, non-polluting alternative fuels.

The rhombic drive, which had previously appeared to be a promising engine development, eventually became undesirable because of its manufacturing difficulty and its high manufacturing cost. Consequently, development efforts, especially in the automotive industry, were generally redirected to the basic Rider design without the rhombic drive.

Research and development efforts have continued on Stirling engines, but the availability of acceptable, relatively low cost, and well developed internal combustion or other engines (such as those in the automotive industry) has limited the scope and depth of such efforts. Currently, Stirling engines are still burdened by limited efficiency and excessive size and weight relative to produced power in various applications, such as, automobiles, powerplants, boats, lawn mowers, etc.

With one exception, there are no developed Stirling engines available for high power applications, even though the Stirling engine is essentially environmentally clean and has the capability of using a wide variety of fuels. Sweden has developed a Stirling engine to drive a 75 kW generator. Two of these engines are used in the Gotland class (Type A-19) submarine. The next generation "Submarine 2000" is expected to use a Stirling engine for propulsion.

Classically, Stirling engines have thus been used to provide direct mechanical power to operate stationary machinery, to propel tractors, trucks and automobiles, to generate electricity for lighting, heating, communication equipment, computers, and electrochemical processes, and to power electric generators for both stationary and mobile applications. With new emphasis on the conservation of resources, it is becoming increasingly important to develop engines that are more efficient and that are capable of using a variety of fuels. The development of non-polluting engines is also important so that engine operation introduces a minimum of pollution into the atmosphere and generates a minimum of hazardous waste products. Additionally, it is becoming increasingly important to develop engines that produce power without excessive noise levels and without a requirement for noise suppression apparatus that otherwise reduces efficiency.

Engine maintenance is also an important consideration. Engines that require frequent lubrication changes increase operating costs in two ways, direct cost of the lubricants and the cost of disposing of the lubricating fluids in a way that is environmentally safe.

The Stirling engine meets all of the desirable requirements described above, except one, i.e., efficiency. With increased efficiency, the Stirling engine may ultimately be capable of being used in a wide variety of applications, including motor vehicle engines, large station power generators, space and other remote power generators, etc., and such applications can be environmentally clean and quiet with use of any of a wide variety of fuels. Further, the size and weight of Stirling engines employed for such uses can be reduced if engine efficiency is increased.

Although there has been a reemphasis in the last twenty years on Stirling engine improvements with newer materials and higher operating temperatures and pressures that have reduced size and weight, little has been done to reshape the actual Stirling thermodynamic cycle so that it more nearly approaches the desired theoretical efficiency to enable substantial increased engine efficiency. In any case, commercial use of Stirling engines has been highly restricted or nonexistent in various applications including power plants, vehicles, lawn mowers, and other apparatus, even in the face of the great Stirling engine attraction of full flexibility, and quiet and non-polluting operations.

Thus, a major need exists for development of the application of Stirling engines in various systems. Further significant improvement in the energy conversion efficiency of Stirling engines is a key to such system developments.

As previously indicated, internal combustion engines have been highly developed and widely used as a result of extensive industrial research and development efforts especially in the production of automobiles and other vehicles. Accordingly, it is also desirable to provide internal combustion engines which operate with better efficiency and reduced atmospheric pollution, even though internal combustion engines lack the fuel flexibility and the quiet, non-polluting operation of Stirling engines.

It is therefore desirable that improvements, having special utility in improving Stirling engine applications, also be adopted insofar as possible to provide improvement in internal combustion engine applications.

SUMMARY OF THE INVENTION

The present invention is directed to Stirling and other engines operating with high efficiency and to systems and apparatus which are powered by such engines with improved energy conversion efficiency and reduced atmospheric pollution.

A drive apparatus of the invention comprises an engine with one or more cylinders, or at least one or more cylinder pairs with a Stirling engine configuration. Each cylinder has a moveable piston contained therein. A system is provided for generating heat and for converting the heat into linear motion of the pistons within the cylinders. A drive system couples the pistons to a load to provide a mechanical drive path through which driving force is applied to the load. The coupling system includes a drive shaft, and gear mechanism means is connected in the drive path between the pistons and the drive shaft and has at least a set of Class 1 elliptical gears of the first type in the drive path to increase the efficiency of the engine and the overall efficiency of the apparatus.

In a first embodiment, the engine is a Stirling engine, and the heat generating system includes a system for heating a first cylinder of the pair of cylinders to heat gas entrapped therein and a system for cooling a second cylinder of the pair of cylinders to cool gas entrapped therein. A regenerator is connected between the first and second cylinders to absorb heat from the entrapped gas when piston motion causes movement of the gas in one direction from the first cylinder to the second cylinder and to transfer heat to the gas when piston motion causes the gas to move in a direction opposite to the one direction.

In a second embodiment of the inventions, the engine is an internal combustion engine, and the heat generating system includes a system for supplying a fuel/air mixture to the cylinders for combustion therein. A flywheel is coupled to the drive shaft.

It is to be understood that both the foregoing general description and the following detailed description are exemplary and are intended to provide further explanation of the invention as claimed.

BRIEF DESCRIPTION OF THE DRAWINGS

The accompanying drawings, which are incorporated in and constitute a part of the his specification, illustrate a preferred embodiment of the invention and together with the description provide an explanation of the objects, advantages and principles of the invention. In the drawings.

DESCRIPTION OF THE INVENTION

Figure 1A:
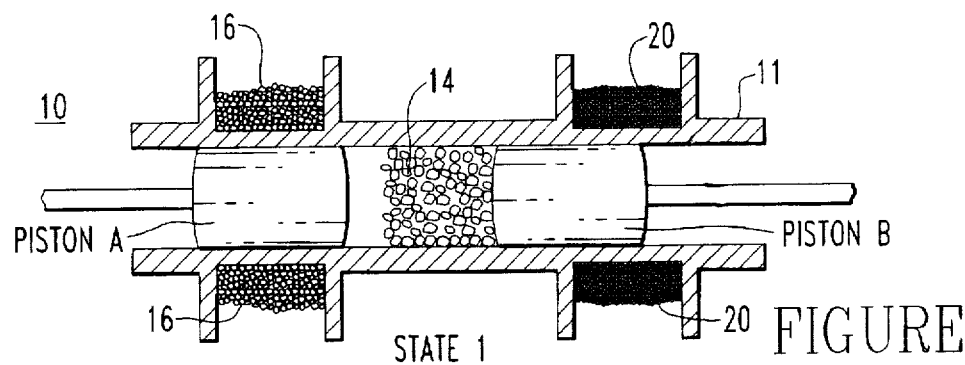
FIGS. 1A through 1D are diagrams that schematically represent four cyclic states of an idealized Stirling engine of the piston displacement type.

The present invention provides structure for an efficient energy conversion apparatus which operates with reduced atmospheric pollution. The invention is especially directed to a Stirling engine and apparatus in which the Stirling engine operates to provide low-noise, low-cost, non-polluting energy conversion with high thermodynamic and apparatus efficiency. More particularly, in the preferred Stirling engine embodiment of the invention, a coupling between the engine and a load enables the actual Stirling engine operating cycle to approach the theoretical Stirling engine operating cycle, thereby significantly improving energy conversion efficiency.

The invention can also be adapted to apply a load coupling of the invention in apparatus having an internal combustion engine to produce drive power with greater efficiency and reduced pollution. An internal combustion embodiment of the invention is described subsequently herein.

There are numerous applications in which Stirling engines, structured and load-coupled in accordance with the invention, can be operated to provide benefits in cost, efficiency, non-pollution, quietness, and fuel flexibility. The following list is representative of such applications:

Small electrical generating systems for rural areas

Small mechanical power sources for pumping water, etc., in rural areas

Mechanical power sources for farm machinery—combines, etc.

Mechanical power for large farm tractors

Mechanical power for heavy construction equipment—cranes, earth movers, bulldozers, etc.

Mechanical/electrical power for transcontinental trains

Mechanical power for transcontinental trucks

Electrical generation for small cities and towns

Mechanical power for city buses

Mechanical/electrical power for automobiles

Mechanical power for boats

Mechanical power for lawn mowers and other small mobile products

Although prior art Stirling engines have been quiet, have had the capability of using a wide variety of fuels, and have been non-polluting as a result of easily controlled fuel-air ratio, they have had drawbacks in size, weight, and relative inefficiency. The present invention significantly increases Stirling engine efficiency thereby enabling reductions in engine size and weight and enabling better energy conversion in apparatus in which the Stirling engine is applied.

FIGS. 1A–1D provide a schematic representation of an idealized Stirling engine 10. In FIGS. 1A–1D, a cylinder 11 contains pistons A and B, each of which moves from left to right, or vice versa, within closed ends (not shown) of the cylinder 11. A graphical representation is shown in FIG. 2 for a thermodynamic cycle of the Stirling engine 10.

Successive states, i.e., State 1, State 2, State 3 and State 4 are represented in the respective FIGS. 1A–1D. The four depicted engine states correspond, respectively, with points 1, 2, 3 and 4 shown on a pressure-volume (P-V) curve 12 of FIG. 2. The ideal Stirling cycle, as represented by curve 12 in FIG. 2, has the same efficiency as a Carnot cycle.

In State 1 (FIG. 1A), the piston B is disposed against a regenerator structure 14, and the piston A is located somewhat to the left of the regenerator 14. At this time, a heat source 16 heats the piston A and entrapped air to the right of the piston A. The volume of air between the two pistons A and B is a minimum and the pressure is a maximum in State 1.

Figure 2:
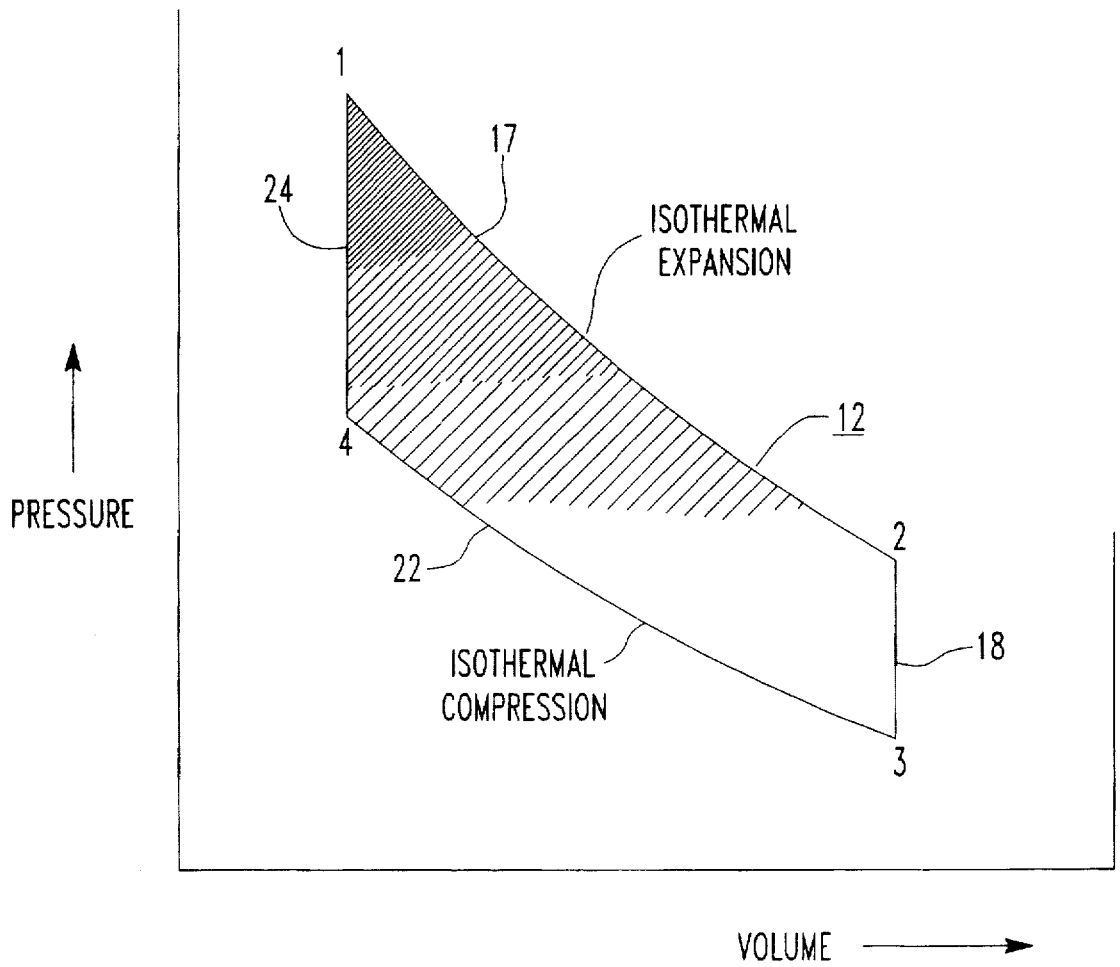
FIG. 2 shows a pressure-volume (PV) curve representing the ideal cycle of states for the engine of FIGS. 1A–1D.

In the maximum air pressure condition, the piston A moves to the left and the entrapped air pressure drops under an isothermal expansion phase 17 (see FIG. 2). The temperature remains constant during the isothermal expansion phase 17 as a consequence of heat supplied by the heat source 16.

Figure 1B:
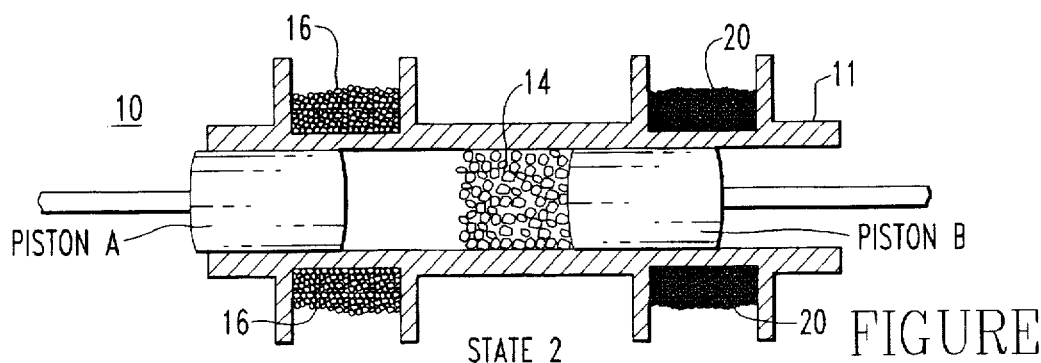
Figure 1C:
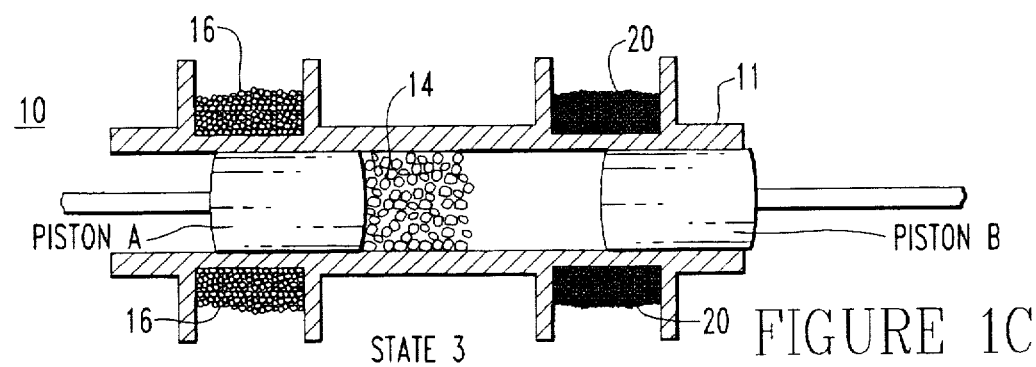
Figure 1D:
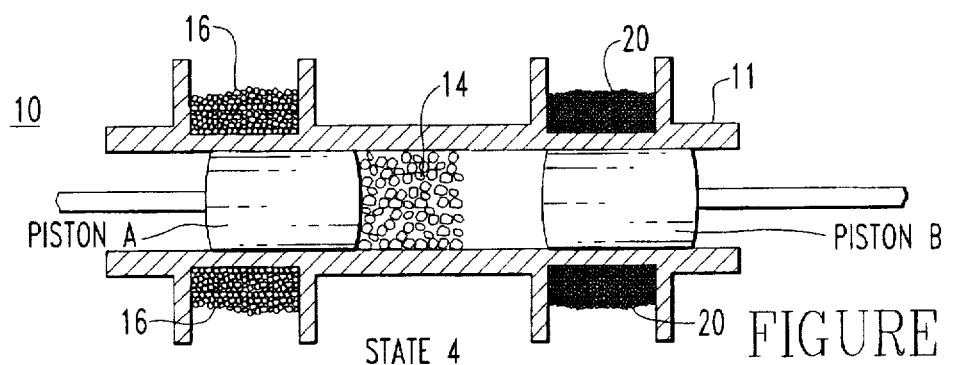

At the end of the isothermal expansion phase 17, the Stirling engine has moved to State 2 (FIG. 1B). Next, both pistons A and B move to the right, with a constant air volume maintained between them as pressure of the entrapped air drops along a phase 18 of the cycle (FIG. 2). In progressing through the constant volume phase 18, the Stirling engine 10 advances from State 2 to State 3 (FIG. 1C).

The pressure drop that occurs over the cycle phase 18 results from the regenerator 14 absorbing heat as the entrapped air passes through it. The regenerator 14 is a body of porous material with relatively high specific heat. Further, the pressure drop of the entrapped air that occurs, as the Stirling engine 10 moves from State 2 to State 3, is aided by a cold reservoir or heat sink 20 disposed around the piston B. As the engine 10 moves from State 2 to State 3, the entrapped air does no work since the air volume remains constant.

In movement of the Stirling engine 10 from State 3 to State 4 (FIG. 1D), the piston B compresses the cooled entrapped air in an isothermal compressing phase 22. The piston A remains against the regenerator 14 during the phase 22.

When the Stirling engine 10 reaches State 4, both pistons A and B move to the left through phase 24, with a constant volume of entrapped air maintained as the engine 10 returns to State 1. During the phase 24, as the entrapped air flows through the regenerator 14 and regains heat lost during the previous expansion, the air temperature and pressure are thereby increased.

In actual practice, the idealized cycle described above has never been achieved nor even closely approached. In most Stirling engine designs, the two pistons A and B are lever connected, directly, or indirectly, to a common crankshaft with a 90-degree phase shift between the two pistons A and B. As a consequence, the two pistons A and B cannot move in synchronism in moving from State 2 to 3 and from State 4 back to State 1. Further, the expansion and compression phases corresponding to the ideal phases 17 and 22 are not really isothermal because the motions provided by a crank, connecting-rod arrangement are approximately sinusoidal in nature.

In accordance with the preferred Stirling engine embodiment of the present invention, apparatus is operated by a Stirling engine through a load coupling which enables the engine to operate significantly closer to the idealized cycle described above and thereby to operate the apparatus with much greater efficiency. All of the benefits previously described as arising from greater Stirling engine efficiency are thus realized with application of the invention.

Figure 3:
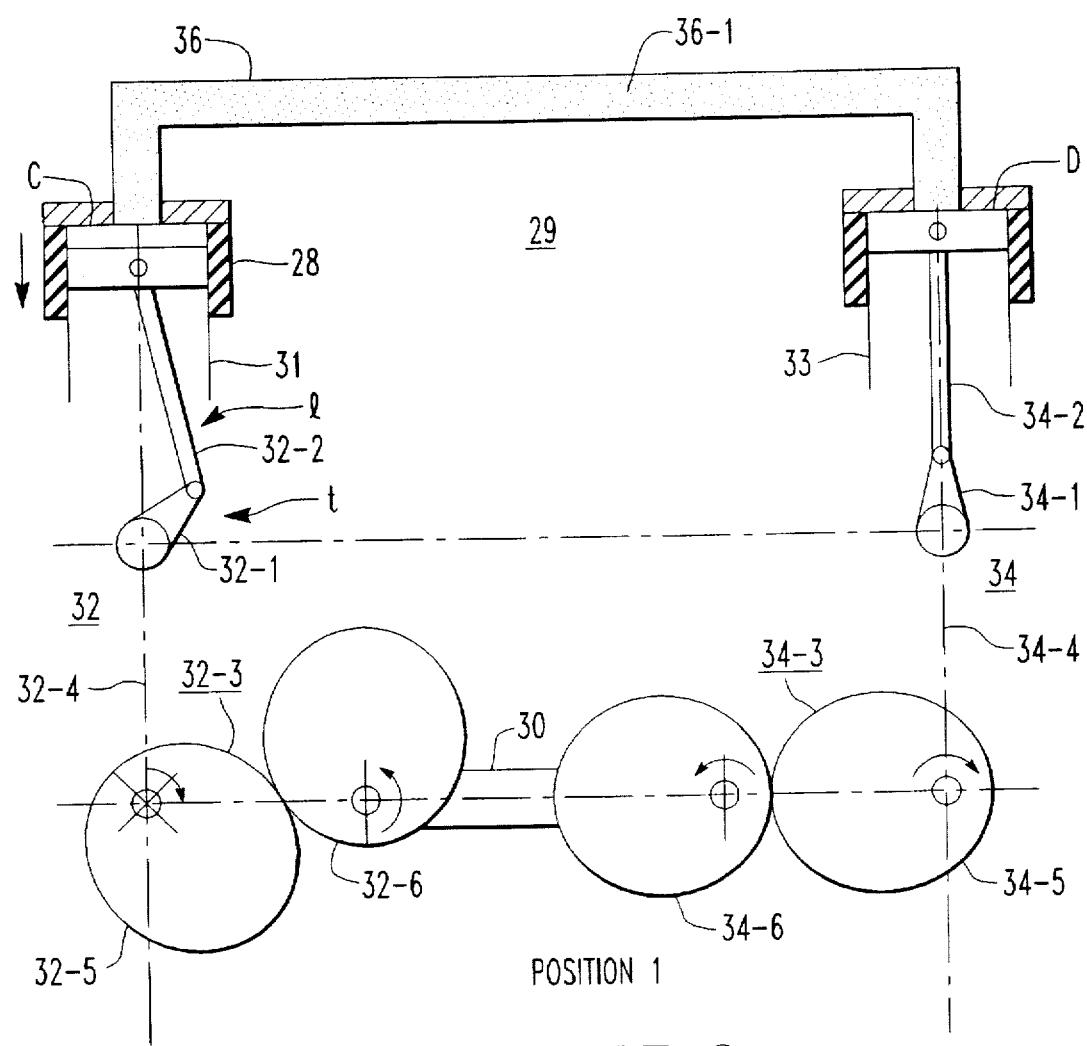
FIG. 3 shows a schematic diagram of a Stirling engine structured in accordance with the invention and having, in this case, a pair of pistons coupled by elliptical gearing to a common drive shaft and positioned in correspondence with a first state of the PV curve of FIG. 2.

More particularly, as shown in FIGS. 3–6, a Stirling engine 29 of the preferred embodiment is comprised of two pistons C and D which are encased in respective hot and cold cylinders 31 and 33 and are coupled to a load (not indicated) through a common drive shaft 30 and through respective couplings 32 and 34. In FIG. 3, Position 1 of the two pistons C and D corresponds to the piston positions shown for the State 1 in FIG. 1A, i.e., the piston C is just beginning to move away from a regenerator 36, whereas the piston D is at the top of its movement against the regenerator 36.

Heat may be supplied to the hot cylinder 31 by a heat source which may be a geothermal source, a solar source, a nuclear source, or a fuel-combustion source. Similarly, cooling of the cold cylinder 33 may be provided by any of various cooling sources.

Figure 4:
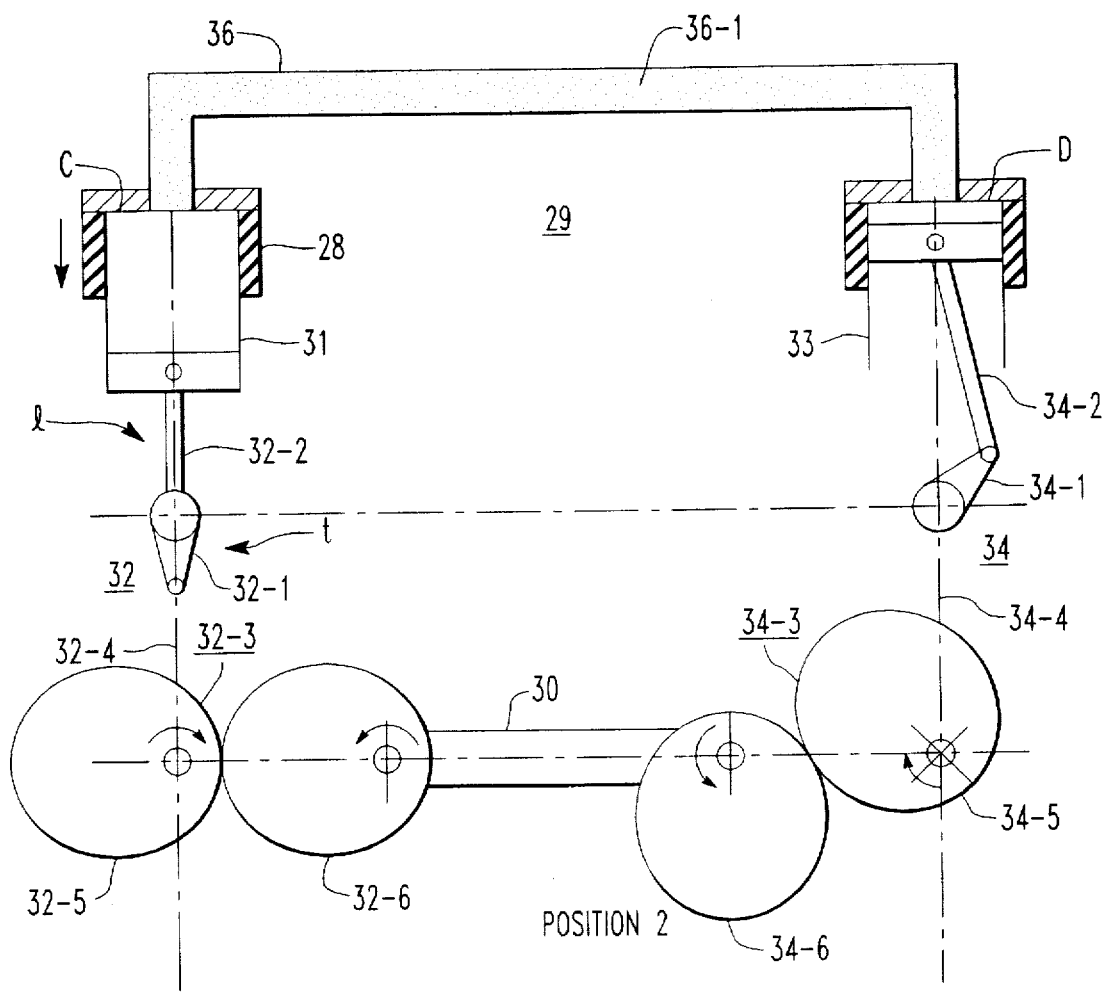
FIGS. 4–6 show the engine of FIG. 3 with the pistons positioned in respective positions corresponding to second, third, and fourth states of the PV curve of FIG. 2.
Figure 5:
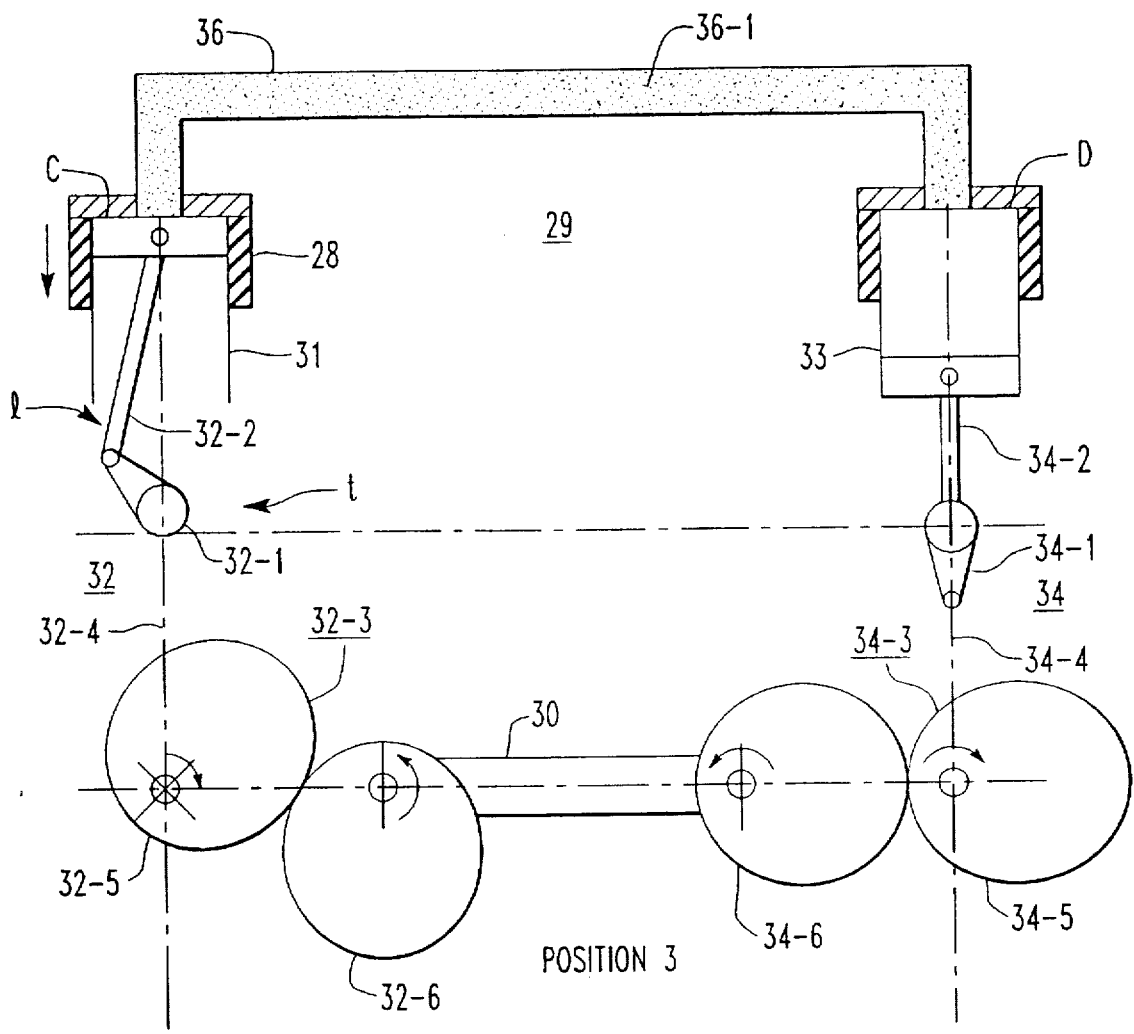
Figure 6:
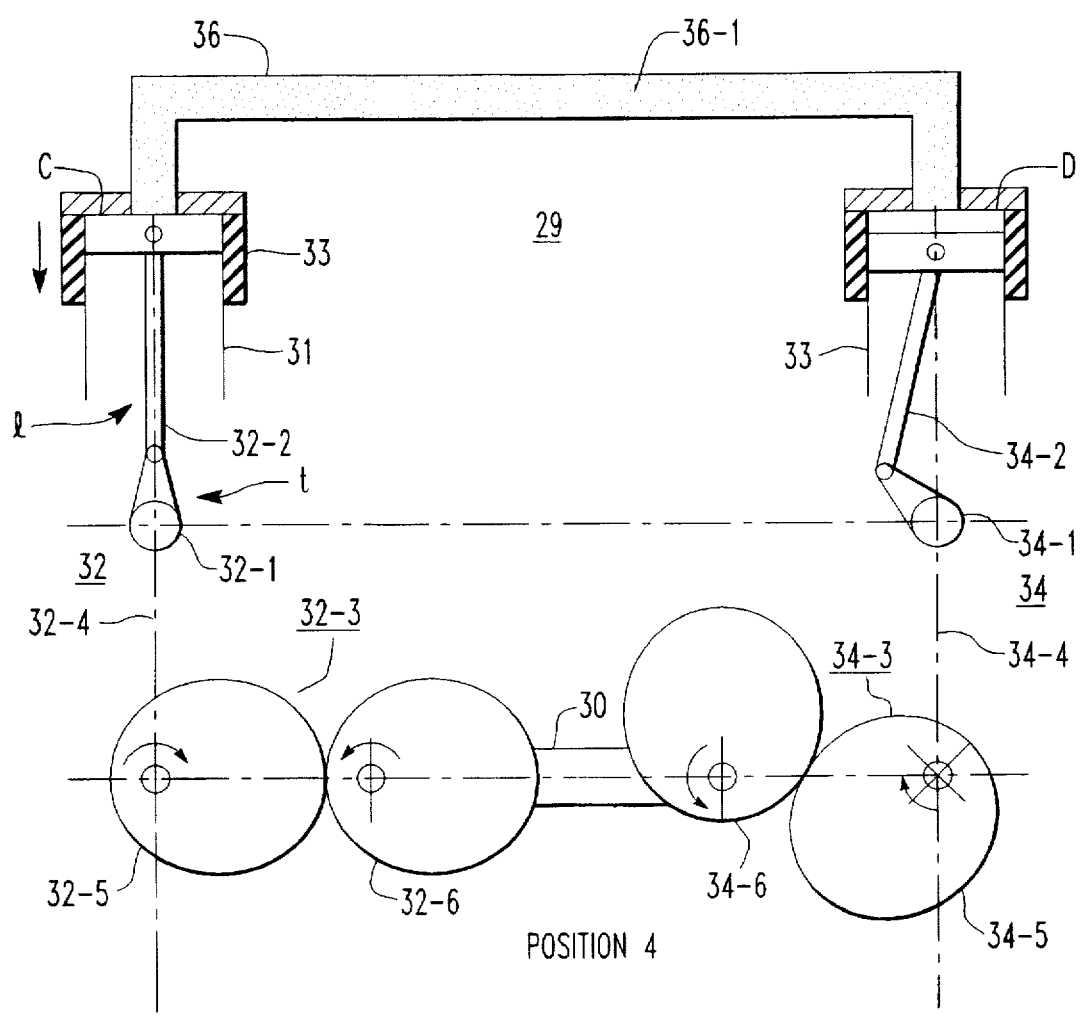

In FIG. 4, the drive shaft 30 has rotated through 90 degrees, and the pistons C and D are located in Position 2 which corresponds to the State 2 in FIG. 1B. In FIGS. 5 and 6, the pistons C and D are located in respective Positions 3 and 4 which respectively correspond to the States 3 and 4 of FIGS. 1C and 1D. In FIGS. 5 and 6, the drive shaft 30 has rotated respectively to 180 degree and 270 degree positions.

The shaft couplings 32 and 34 each include a crankshaft 32-1 or 34-1 which couples a piston rod 32-2 or 34-2 to the drive shaft 30 through a gear mechanism 32-3 or 34-3. Thus, linear up-down motions of the pistons C and D cause rotary motion of the crankshafts 32-1 and 34-1 which in turn drive the gear mechanism 32-3 and 34-3 to rotate the shaft 30 and drive the apparatus load.

The crankshaft 32-1 or 34-1 includes a shaft 32-4 or 34-4 on which a gear 32-5 or 34-5 is disposed. In turn, the gear 32-5 or 34-5 is engaged with a gear 32-6 or 34-6 disposed in driving relationship with the shaft 30.

To increase the Stirling engine efficiency significantly closer to the idealized engine cycle efficiency, each of the gears 32-5, 32-6, 34-5, and 34-6 is preferably a Class I elliptical gear, of the first type preferably with an eccentricity that optimizes engine efficiency. In other words, each of the elliptical gears rotates about one of its focal points.

In operation, the piston C controls the gas during expansion, and the piston D controls the gas during compression. There is one maximum and one minimum per shaft revolution.

Figure 7:
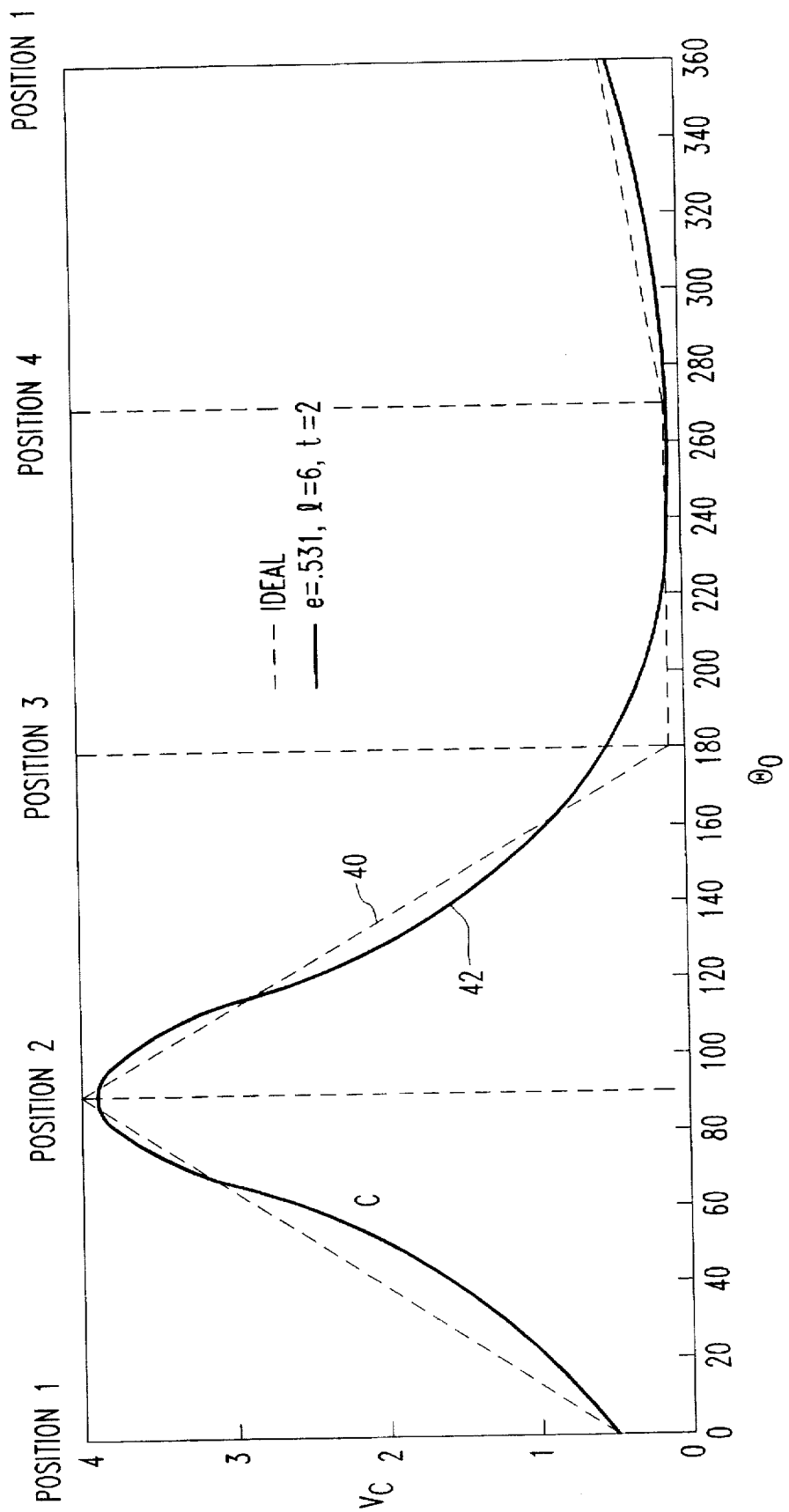
FIG. 7 is a graph that compares the motion of a piston A through a cycle in the idealized engine of FIGS. 1A–1D with that of piston C of the invention depicted in FIGS. 3–6.

In FIG. 7, a dashed linear curve 40 represents idealized motion for the piston C over a complete shaft revolution; a solid curve 42 corresponds to the actual piston motion achieved in the preferred Stirling engine embodiment with the elliptical gear drive with gear eccentricities of 0.531. In FIG. 7, $\theta_0$ represents the drive shaft angle and V represents the cylinder displacement.

As shown, the correspondence between the actual and idealized curves is very good. In fact, the idealized sharp triangular peak at 90 degrees is undesirable since it requires infinite deceleration. In contrast, the rounded peak at the apex of the actual solid curve 42 is much more desirable since it limits mechanical stresses to practical values.

Figure 8:
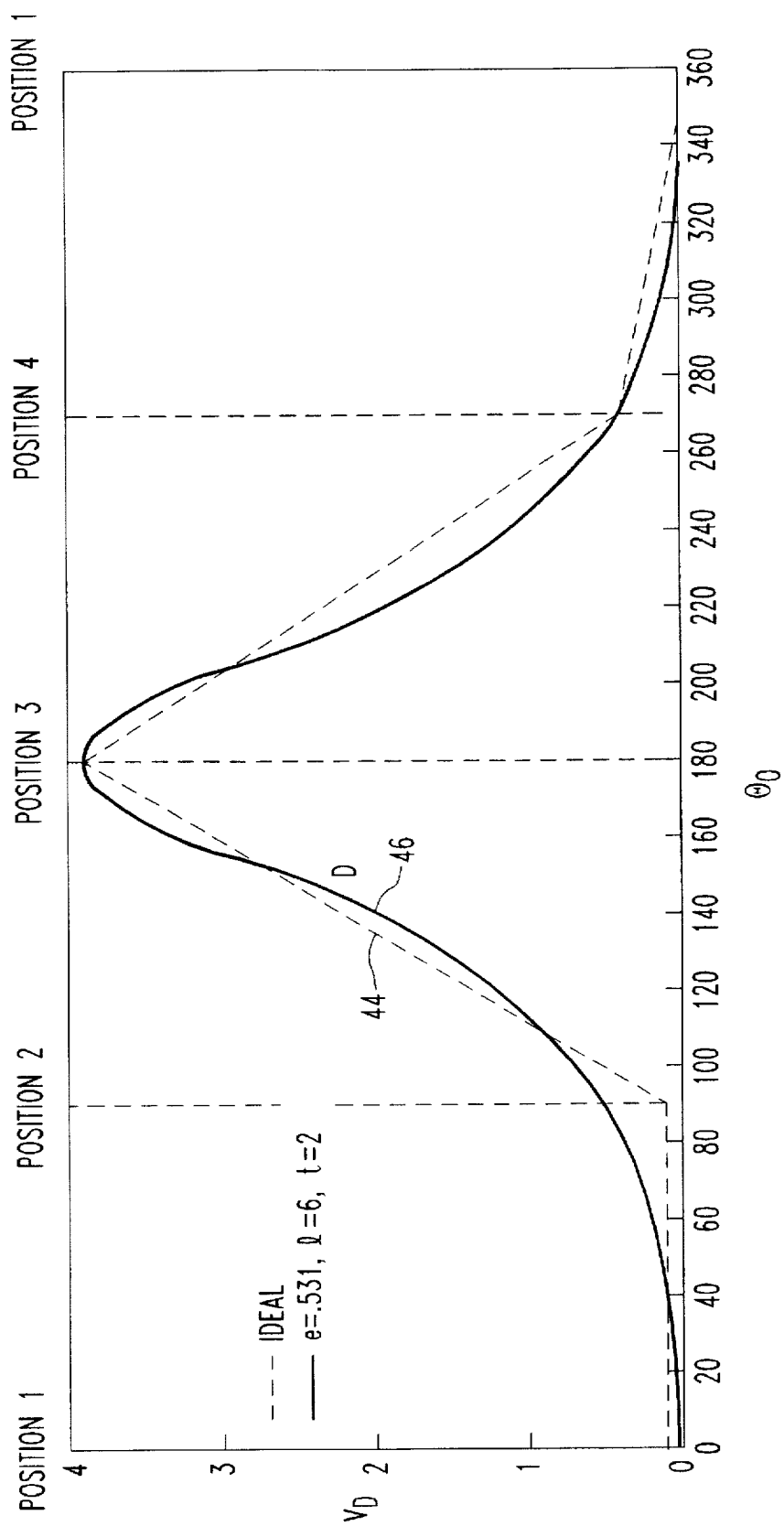
FIG. 8 is a graph similar to that of FIG. 7, but it applies to respective pistons B and D in FIGS. 1A–1D and FIGS. 3–6.
Figure 9:
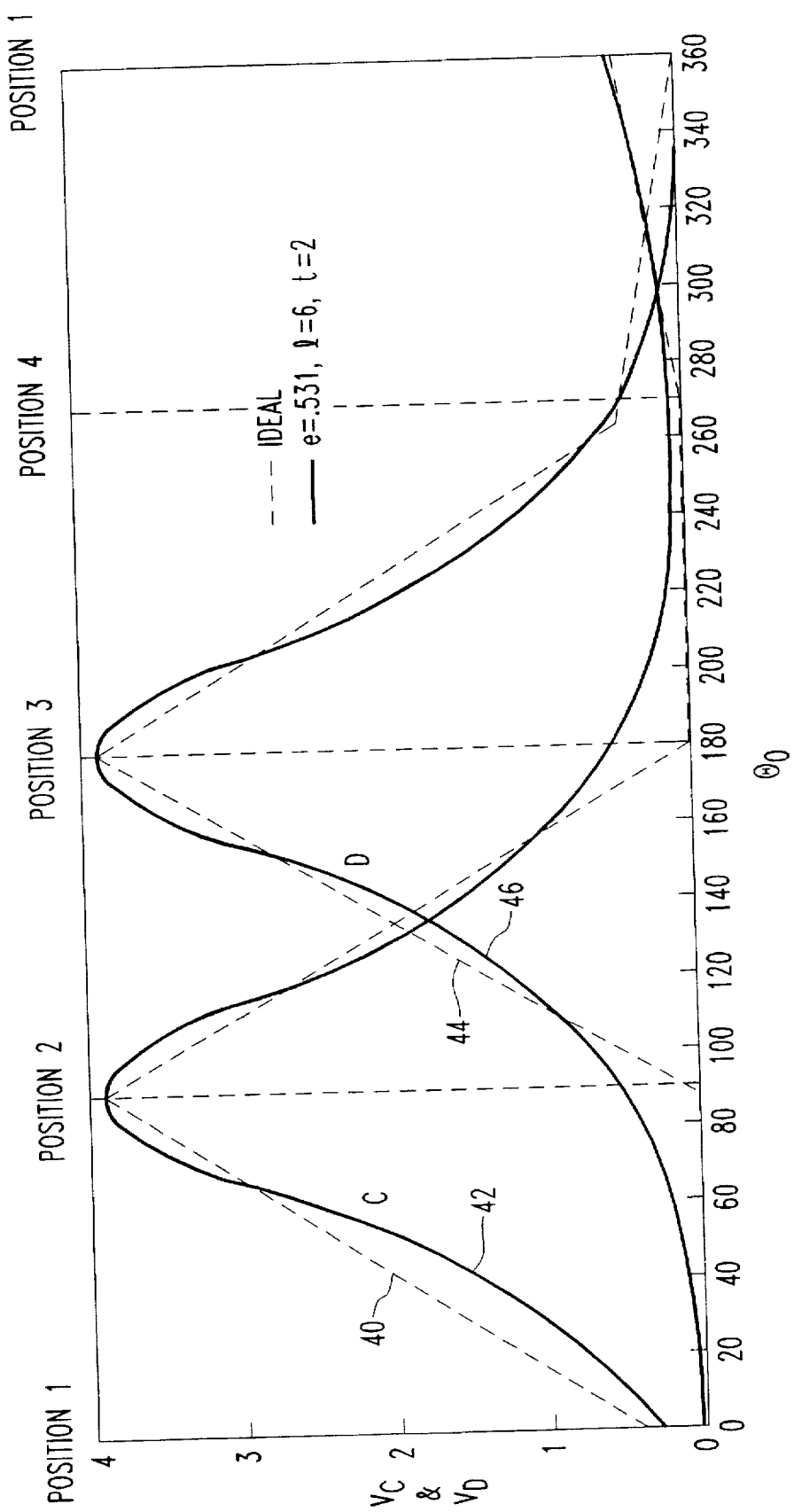
FIG. 9 is a graph representing a composite of the graphs of FIGS. 7 and 8.
Figure 10:
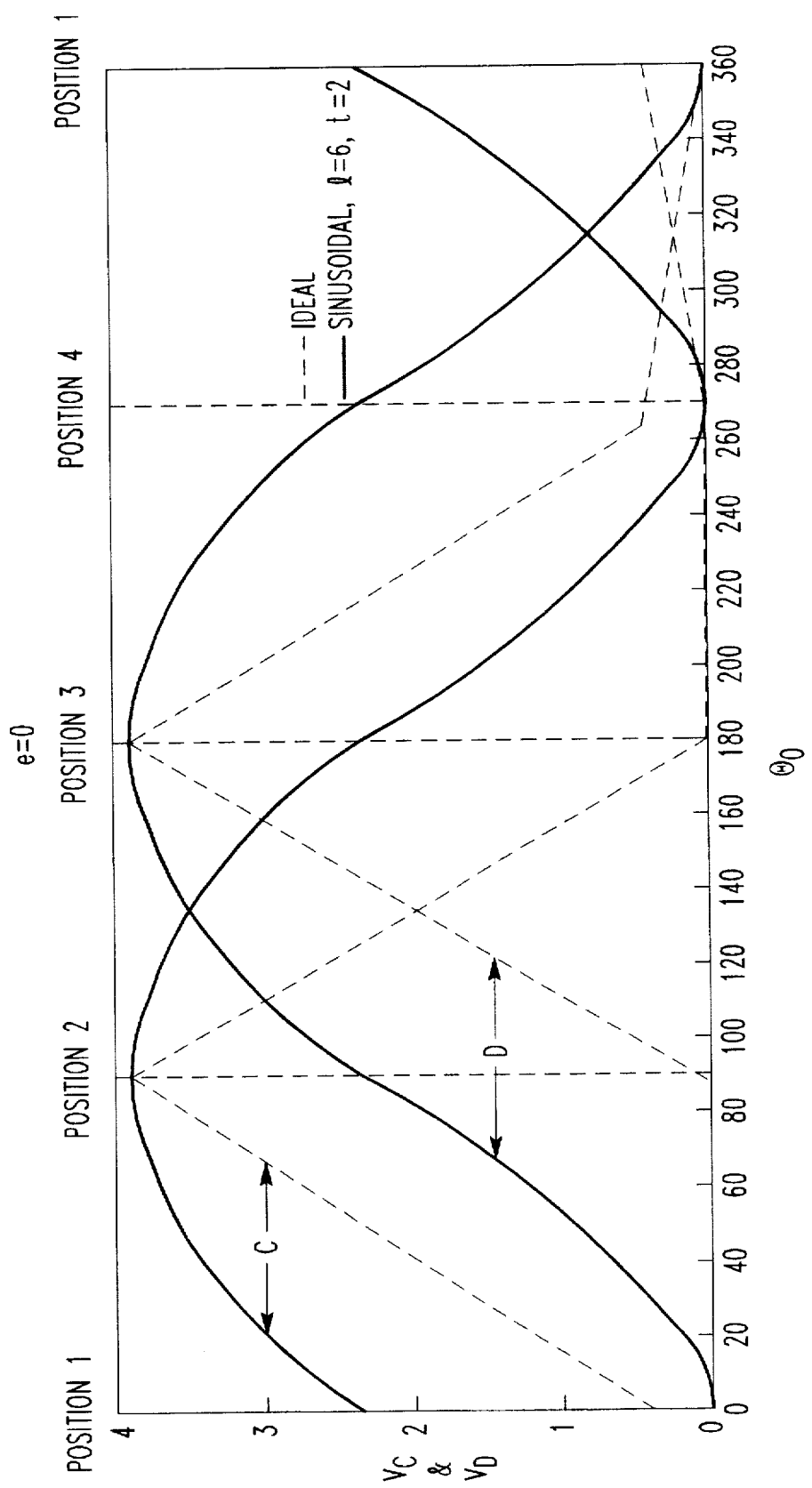
FIG. 10 shows piston motion for a typical prior art Stirling engine having a conventional crankshaft or gear drive.

FIG. 8 shows a similar set of curves 44 and 46 for the piston D. FIG. 9 shows a composite set of the curves 40-46 for both pistons C and D. The improvement provided by the preferred embodiment of the invention, in achieving better correspondence between the actual and theoretical Stirling thermodynamic cycles, is observed by comparing the composite curves of FIG. 9 to those of FIG. 10 which correspond to a simple prior art crankshaft drive or a prior art gear drive where the gear eccentricities are equal to zero.

As demonstrated by FIGS. 7-10, the shaft coupling of the invention, and particularly the Class I elliptical gear drive, clearly enables improved engine and load apparatus efficiency through better energy conversion efficiency, as well as other advantages.

The crankshaft angle for the piston C is related to the rotation angle of the drive shaft by the following equation, where $\theta_0$ is the drive shaft angle and $\theta_0$ is the crankshaft angle:

$$\sin \theta_2 = \frac{(1-e^2) \sin \theta_0}{(1+e^2+2e \cos \theta_0)}$$

When using a calculator to calculate $\theta_2$ for increasing values of the argument, $\theta_0$, a value of 90 degrees is reached; as $\theta_0$ continues to increase, the calculated value for $\theta_2$ is subtracted from 180 degrees, until the value for $\theta_2$ reaches 270 degrees. Beyond 270 degrees, 360 degrees are added.

Another equation relates cylinder displacement, V, to crankshaft angle, $\theta_2$, as a function of connecting rod length l, crank throw, t, and cylinder cross-sectional area, A, as follows:

$$V = A \left[ l + t(1 - \cos \theta_2) - \sqrt{l^2 - t^2 \sin \theta_2} \; \right]$$

Figure 11A:
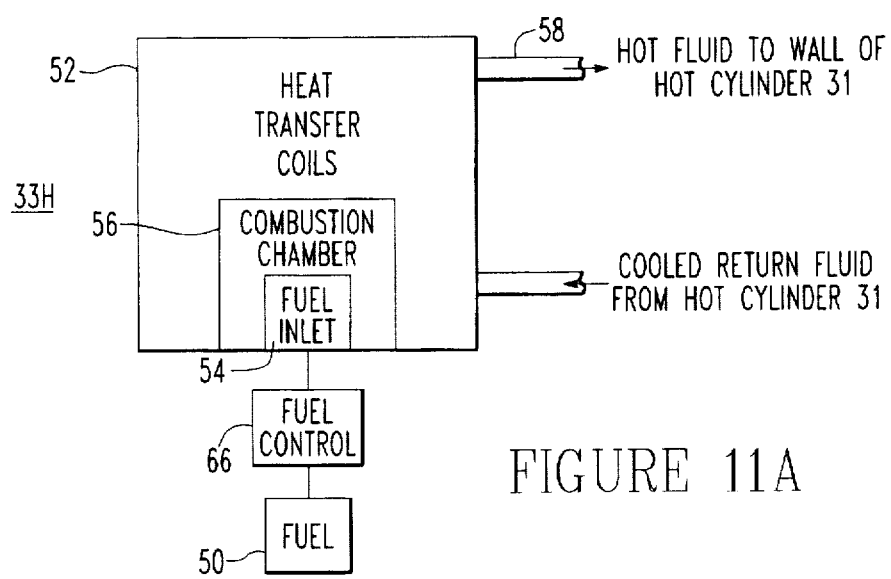
FIGS. 11A–11C show heating/cooling arrangements for the Stirling engine of the invention.

In the Stirling engine 29 of the preferred embodiment of invention, a combustion heat source 33H (FIG. 11A) is configured in dependence upon the fuel selected for use (gaseous, liquid or solid). Fuel 50 (FIG. 11A) is burned in a combustor 52 with use of an inlet: 54, such as a jet, a nozzle or a chain grate. Gaseous fuel is introduced into a combustion chamber 56 of the combustor 52 under gas pressure through a jet (not specifically shown). Atomized liquid fuel is injected through a nozzle (not specifically shown) with pressure from a gear pump (not shown). Solid fuel is pushed onto a moving grate by a stoker (not specifically shown).

There are two basic ways to transfer heat to the hot cylinder(s) 31 from the heat source 33H:

I. The burning fuel heats a heat-transfer fluid 58 (FIG. 11A) circulating in coils in the combustor 52. The heat-transfer fluid is then pumped through cavities (not shown) in a wall of the cylinder 31 (FIGS. 3–6). This is the preferred method for large stationary engines.

Figure 11B:
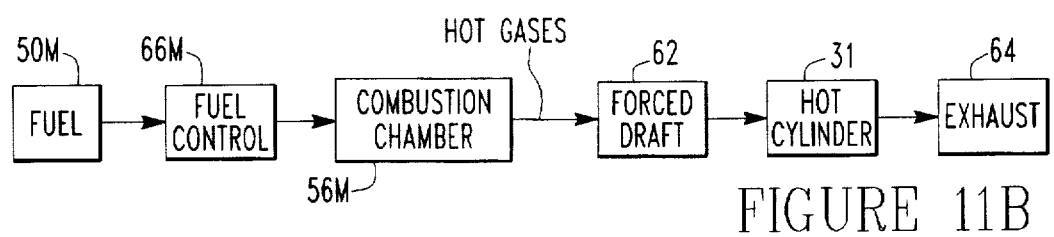

II. For mobile energy conversion apparatus (FIG. 11B), hot gases from a combustion chamber 56M, under a forced draft 62, are blown through cavities (not shown) surrounding the hot cylinder(s) 31 (FIGS. 3–6), prior to exhausting through a tail pipe 64 (or a stack). The external wall surfaces of the hot cylinder(s) 31 (FIGS. 3–6) are preferably finned (not shown) for good heat transfer.

An electronic control 66 or 66M (FIGS. 11A or 11B) regulates the fuel combustion rate through metering valves in the jets or nozzles. For solid fuels, the speed of the chain grate and stoker combination is advanced or retarded to speed up or slow down the combustion rate.

The fuel-air mixture is controlled electronically by means of the speed of a forced-draft motor (not shown) and a damper (not shown). Since fuel is burned without interruption in the Stirling engine 29 (FIGS. 3–6) (in contrast to an internal combustion engine), the fuel-air ratio can be accurately controlled as the fuel flow is varied to meet load demand so that substantially complete combustion occurs and a minimum of CO gases are produced for exhaust. For solid fuels, the exhaust is composed almost exclusively of water vapor and $CO_2$.

Figure 11C:
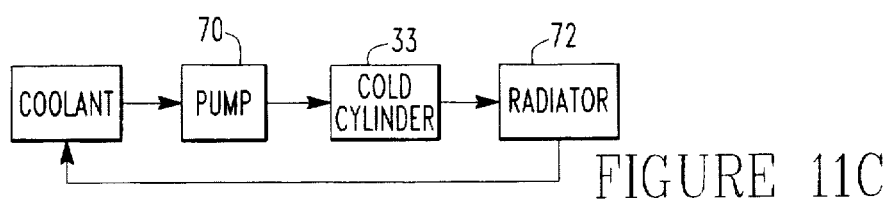

Cooling (FIG. 11C) of the Stirling engine 29 (FIGS. 3–6) is accomplished by means of a water/ethylene-glycol mixture circulated by means of a pump 70 through a heat sink (i.e. cavities, not shown) in a wall of the cold cylinder 33 and a radiator 72. Air is drawn through the radiator by means of a fan (not shown), thereby transferring heat to the air. For large, stationary Stirling engine installations of the invention, a cooling tower or an available water source may be used.

Figure 11D:
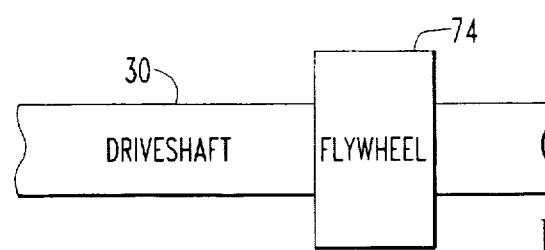
FIGS. 11D–11H are schematic diagrams of various applications of the invention.

The drive shaft 30 preferably has a flywheel 74 (FIG. 11D) and rotates essentially at a constant angular velocity during each complete cycle. The hot piston C delivers energy to the drive shaft 30 during the expansion stroke. Conversely, the drive shaft 30 delivers energy to the cool piston D during the compression stroke.

The number of cylinder pairs and the cylinder displacements in any particular engine or power plant depend upon the load requirements. For example, a 16-cylinder-pair engine with cylinder diameters of 18.5 cm. and strokes of 24 cm., and isothermal temperatures of $T_1=527°$ C. and $T_2=350°$ C. respectively, develops a theoretical output (friction losses ignored) of about 600 HP at a drive shaft speed of 1000 RPM.

On the other hand, a single-cylinder-pair engine with a piston diameter of 6.2 cm. and a stroke of 8 cm., with the same isothermal temperatures as above, has a theoretical output of about 4.5 HP at a drive shaft speed of 3000 RPM. The first engine might be applied in a large tractor or a patrol boat; the latter would be suitable for a lawn mower.

Figure 12:
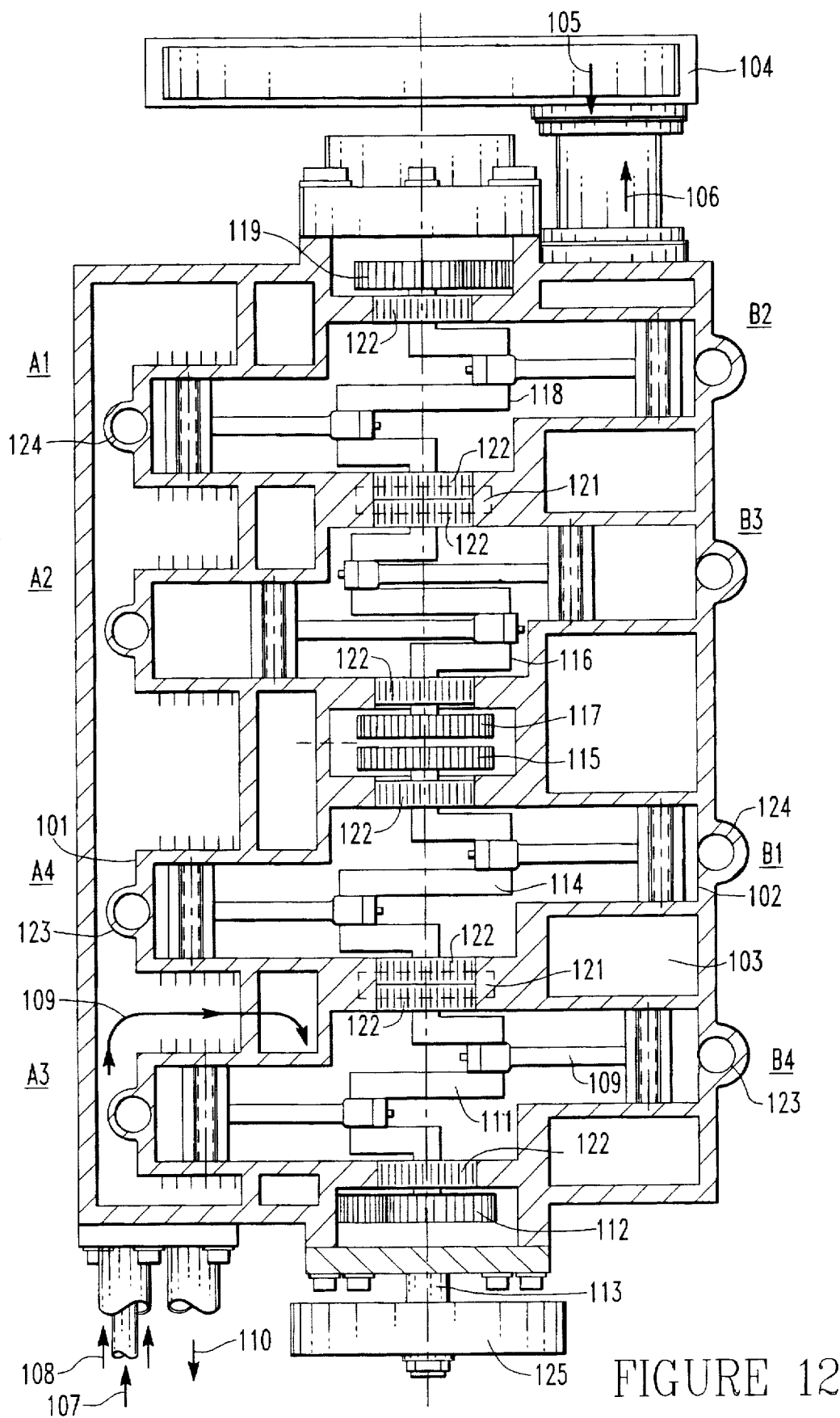
FIG. 12 shows a developed view of a vehicular embodiment of the Stirling engine apparatus of the invention.
Figure 15:
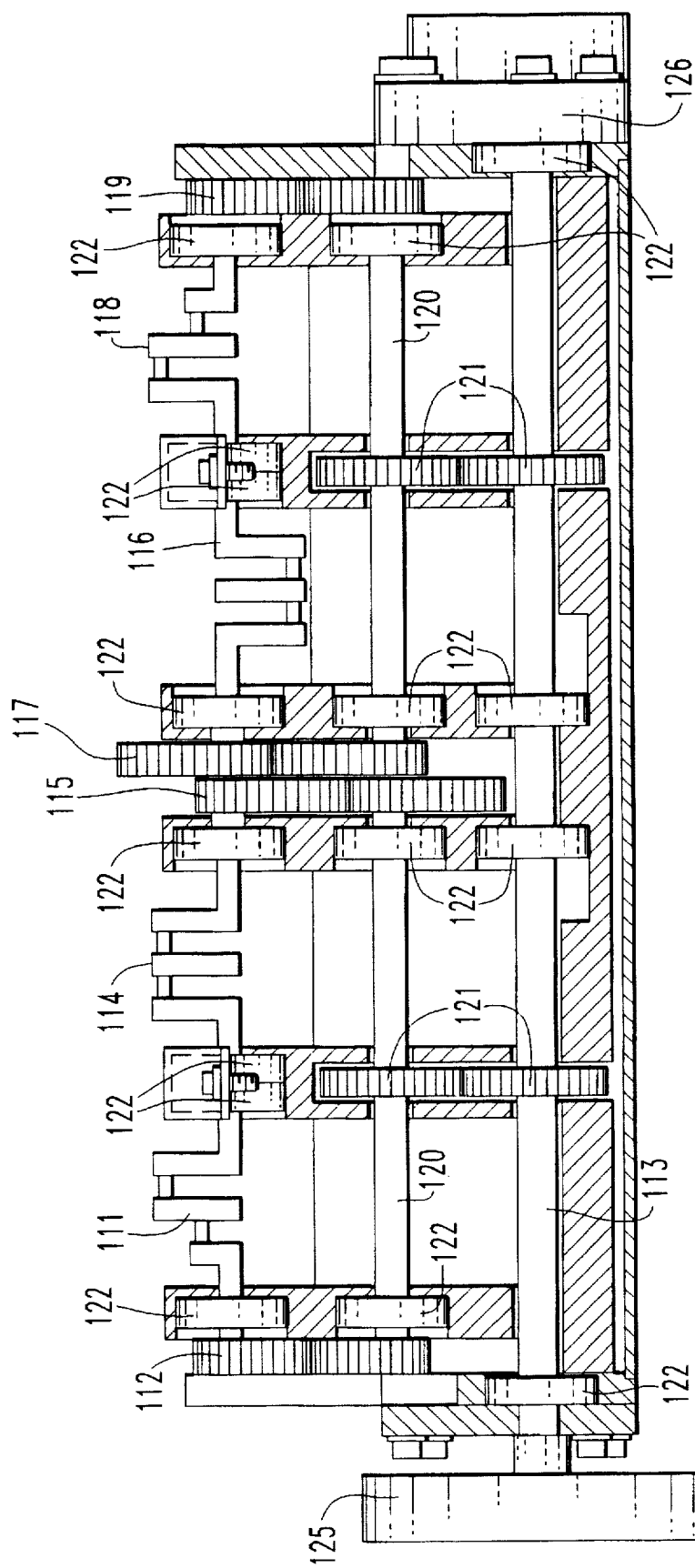
FIG. 15 shows a sectional view of the apparatus of FIG. 12 taken along reference line B—B in FIG. 14.

In general applications of the invention, each hot and cold cylinder preferably has its own pair of elliptical gears that connect between their crankshafts and the common drive shaft (see FIGS. 12 & 15). With multiple cylinder pairs, the elliptical gear phasing with respect to the drive shaft is preferably arranged so that the power strokes of the several pairs is distributed equally over one revolution of the drive shaft. For example, with a four-cylinder-pair engine, there will be a power stroke for every 90 degrees of drive shaft rotation.

Figure 11E:
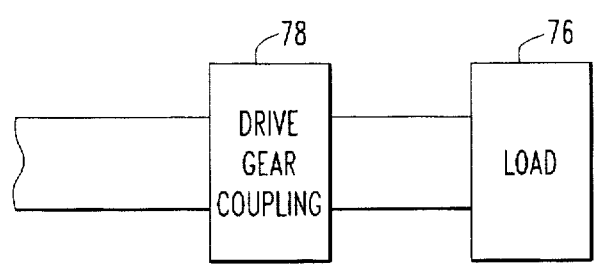
Figure 11F:
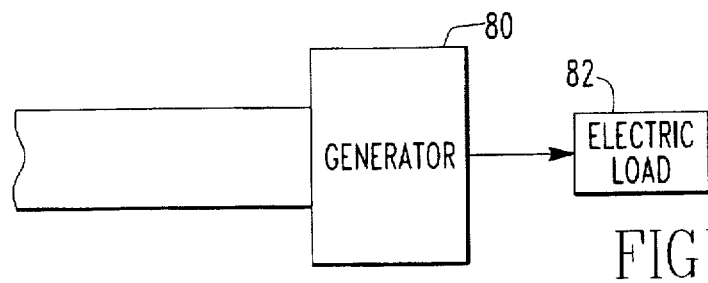

For stationary drive applications of Stirling engines in the preferred embodiment of the invention, the drive shaft 30 drives a load 76 or machinery (FIG. 11E) directly by gearing 78. The shaft 30 may also drive an alternator or generator 80 (FIG. 11F) to provide AC or DC electricity for electric energization of various electrical or electronic load devices 82.

Figure 11G:
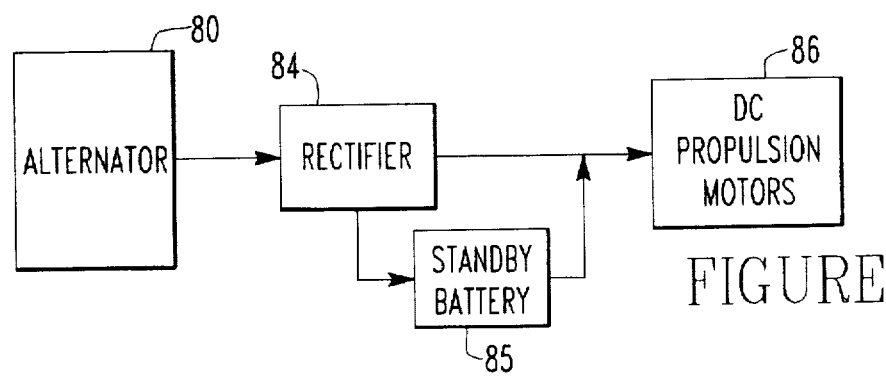

For mobile load applications of Stirling engines, such as cars or trucks, the drive shaft 30 normally drives an alternator. The generated AC electric power (FIG. 11G) is then rectified by a rectifier 84 to operate DC wheel-drive motors 86 (FIG. 11G) for propulsion.

Figure 11H:
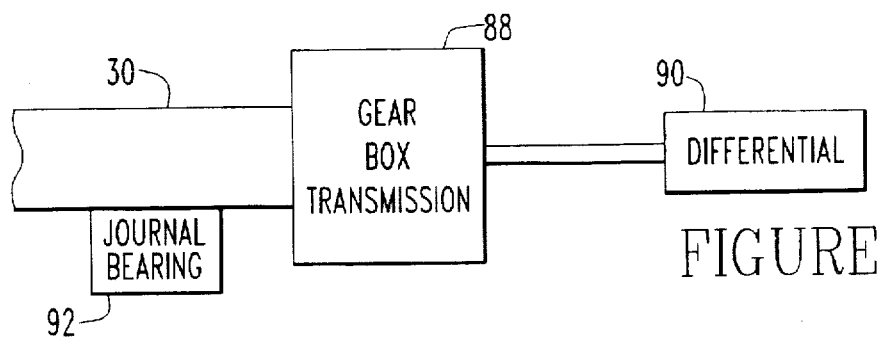

As an alternative, the drive shaft 30 mechanically drives a gear box transmission 88 (FIG. 11H) and a differential 90 of the mobile load. The drive shaft 30 is supported in journal bearings 92 similar to the manner in which crankshafts are supported in internal combustion engines.

A more detailed mechanical scheme for a vehicular drive, arranged in accordance with the preferred embodiment of the invention, is described subsequently herein.

Generally, Stirling engines are quiet because combustion occurs at a steady rate. Thus, noise level of the engine 29 of the preferred embodiment is similar to that of a gas or oil-fired furnace. In an internal combustion engine, noise is developed when the fuel is ignited and burns rapidly and then generates a gaseous pressure wave. During the exhaust part of the internal combustion engine cycle, the hot gas is released through a muffler and tail pipe to generate an additional sound pressure wave. The working gas (air) in a Stirling engine is totally confined except for leakage around the piston rings. This air loss is compensated by air injection with a pump. Since the working gas is not exhausted to the outside environment, there is no impulsive noise associated with combustion exhaust.

The regenerator 36 (FIGS. 3–6) is composed of a pipe or box in which a porous material 36-1 having a high specific heat is contained. The regeneration material may, for example, be steel, tungsten, tantalum, etc., formed into a metallic wool sponge or collection of small pellets, or a stiff wire grid. The regenerator 36 absorbs heat during the phase transition from state 2 to state 3, thereby cooling the working air from temperature $T_1$ to $T_2$. The regeneration material must be sufficiently porous to avoid creating a significant pressure differential during the transition. During the phase transition from state 4 to state 1, the reverse process occurs and heat is recovered from the regenerator 36, to assist in raising the air temperature back to the $T_1$ level.

In implementing the invention in its preferred form, i.e., with a Stirling engine, there are no particular limits on engine size, i.e., engines of the invention can range from fractional horsepower sizes to sizes rated at hundreds or thousands of horsepower for mobile applications or much higher power for stationary energy conversion applications. During the mid-1880's, small Stirling engines were used on farms for a variety of purposes such as pumping water and shelling corn. During the 1970–1990 time frame, experimental Stirling engines were built for possible automobile application, and sizes of such engines have been on the order of 100 to 200 horsepower. However, these Stirling engines made no use of the principles of the invention and as a consequence we:re bulky and heavy and operated with relatively poor efficiency.

With application of the invention, Stirling engines can be designed up to the same size as the largest, low-speed diesel engines, such as 16 cylinder diesels generating 60,000 horsepower. In fact, because the engine combustion process is continuous, such larger Stirling engines of the invention can be highly efficient while being much simpler than diesel engines of comparable power.

In the preferred Stirling engine application of the invention, the rate of fuel consumption changes relatively gradually, and the amount of air needed for complete combustion can be controlled electronically by measuring the amount of CO in the exhaust. In most applications (see FIG. 11G), the engine drives a generator which generates electricity to power electric motors with the motor speed electrically controlled. A stand-by battery 85 is charged when generated power exceeds load power demand. When the power demand exceeds Stirling engine generated power, the battery power makes up the difference. As a consequence, the engine speed need not change rapidly during acceleration or deceleration.

In Stirling engine applications of the invention, the principal factor affecting efficiency is control of the motion of the hot and cold pistons (C and D) by means of Class 1 elliptical gearing so that the resulting Stirling P-V cycle more nearly matches the desired Stirling theoretical P-V cycle. The desired Stirling cycle is an isothermal expansion and an isothermal compression coupled by two isochoric changes (constant volume movement of the working gas through the regenerator). The present invention enables a close approximation of the actual cycle to the ideal cycle.

A second major efficiency consideration is the manner in which heat is transferred from the combustion chamber to the hot cylinder(s) 31, i.e. indirectly by means of a heat-transfer fluid or directly by circulating flue gases around the hot cylinder(s) 31.

Theoretically, an ideal Stirling engine has an efficiency that corresponds to that of a Carnot cycle, i.e., $$\text{Efficiency}=(T_1-T_2)/T_1$$

The theoretical efficiencies of both the OTTO and DIESEL cycles cannot match that of the theoretical Stirling engine. It is clear from the above equation that with greater temperature differential ($T_1-T_2$), a greater efficiency is realized. Thus, the hot cylinder(s) 31 is preferably operated at as high a temperature as possible within metallurgical constraints. Further, the cold cylinder(s) 33 are preferably cooled to a temperature close to that of the outside working environment. Since the hot combustion gases do not contact sliding parts, the combustion gases can be much hotter than in a Diesel or Otto engine. Thus, both greater efficiency and longer engine life are achieved by the invention.

By increasing the Stirling engine efficiency, the Stirling engine size and weight can be reduced for the same horsepower output.

A more detailed version of the preferred Stirling engine embodiment invention is illustrated in FIGS. 12–15. These FIGURES show an eight-cylinder Stirling engine layout that can be applied for vehicular propulsion. With reference to FIG. 12, there are four hot cylinders 101 and four cold cylinders 102. The hot cylinders 101 are preferably finned to provide good heat transfer from the combustion gases to the cylinder walls. The cold cylinders 102 are provided with a coolant jacket 103 to transfer heat to a radiator 104 (See FIGS. 12 and 14). Coolant inlet and outlet piping to and from the engine is indicated by reference characters 105 and 106.

Fuel is introduced through a fuel line 107. Liquid fuels would be pumped in and sprayed out through a series of nozzles in the combustion chamber; gaseous fuels would be introduced through a pressure regulator and would be injected into the combustion chamber by a series of jets.

Air for combustion is supplied by a blower (not shown) through an air manifold 108. The fuel/air ratio is controlled electronically by varying the fuel pressures and the air blower speed. The fuel/air ratio is adjusted to provide for complete combustion and a minimum of polluting exhaust gases. The hot gases from the combustion follow a path 109; the gases rise and swirl around the finned hot cylinders 101 and then are directed downward and out through an exhaust pipe 110.

Figure 14:
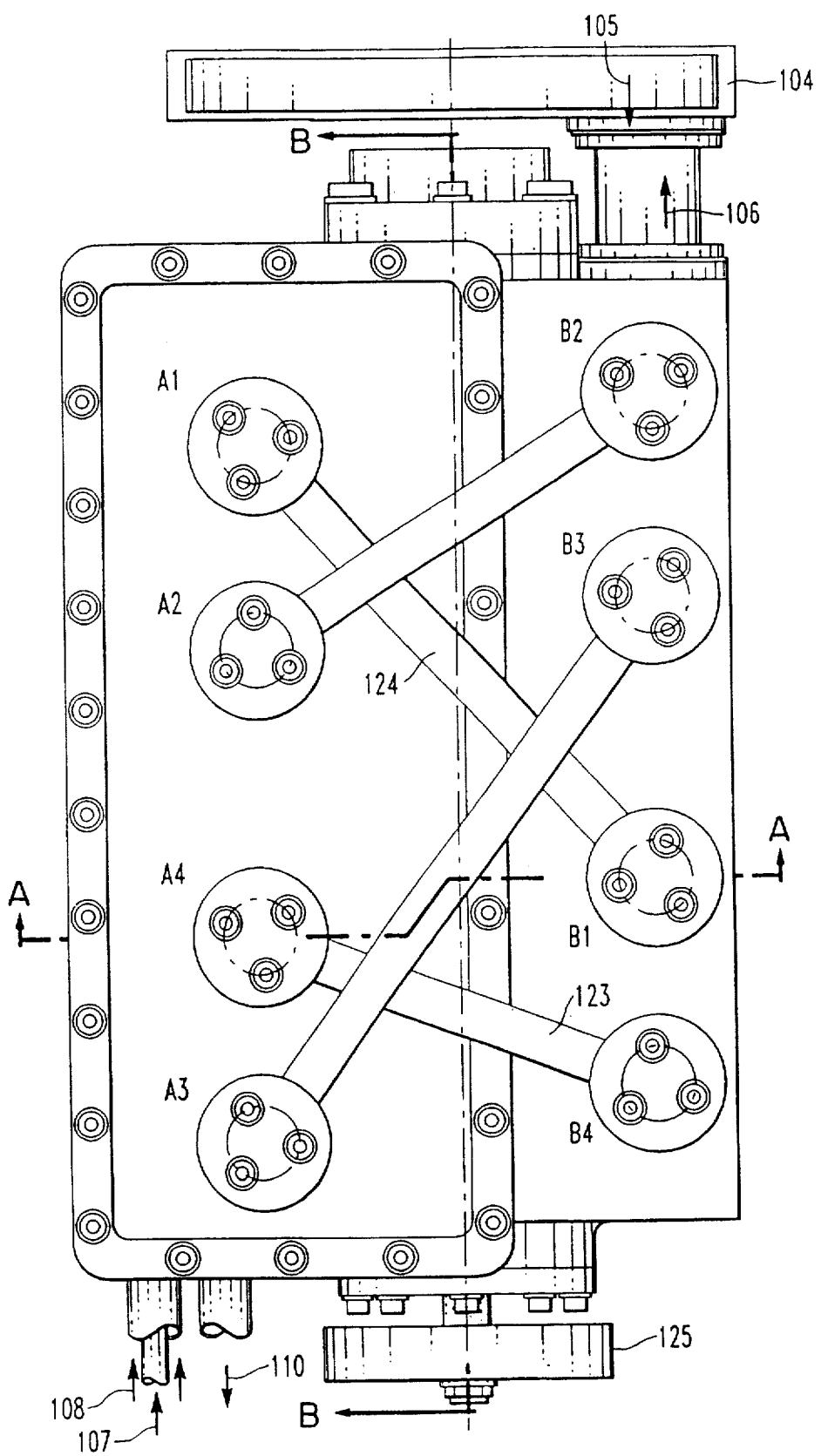
FIG. 14 shows a top plan view of the Stirling engine apparatus of FIG. 12.

The hot cylinders are labeled A1, A2, A4, and A3. The corresponding cold cylinders are labeled B2, B3, B1, and B4. Cylinders A1 and B1, A2 and B2, A3 and B3, and A4 and B4 form working pairs. The ordering of the cylinders shown in FIGS. 12 and 14 provide proper phasing for the several pistons. For example, pistons for the cylinders A3 and B4 are connected to a two-crank crankshaft 111, which is coupled to one set of elliptical gears 112. This arrangement is used since both pistons for the cylinders A3 and B4 have the same phase relationship i.e., both show the same piston displacement from top dead center for each angle of rotation of the drive shaft 113. Crankshaft 114 is coupled to an elliptical gear pair 115; crankshaft 116 is coupled to another elliptical gear pair 117; and crankshaft 118 is coupled to a fourth elliptical gear pair 119. (See FIG. 15.)

Figure 13:
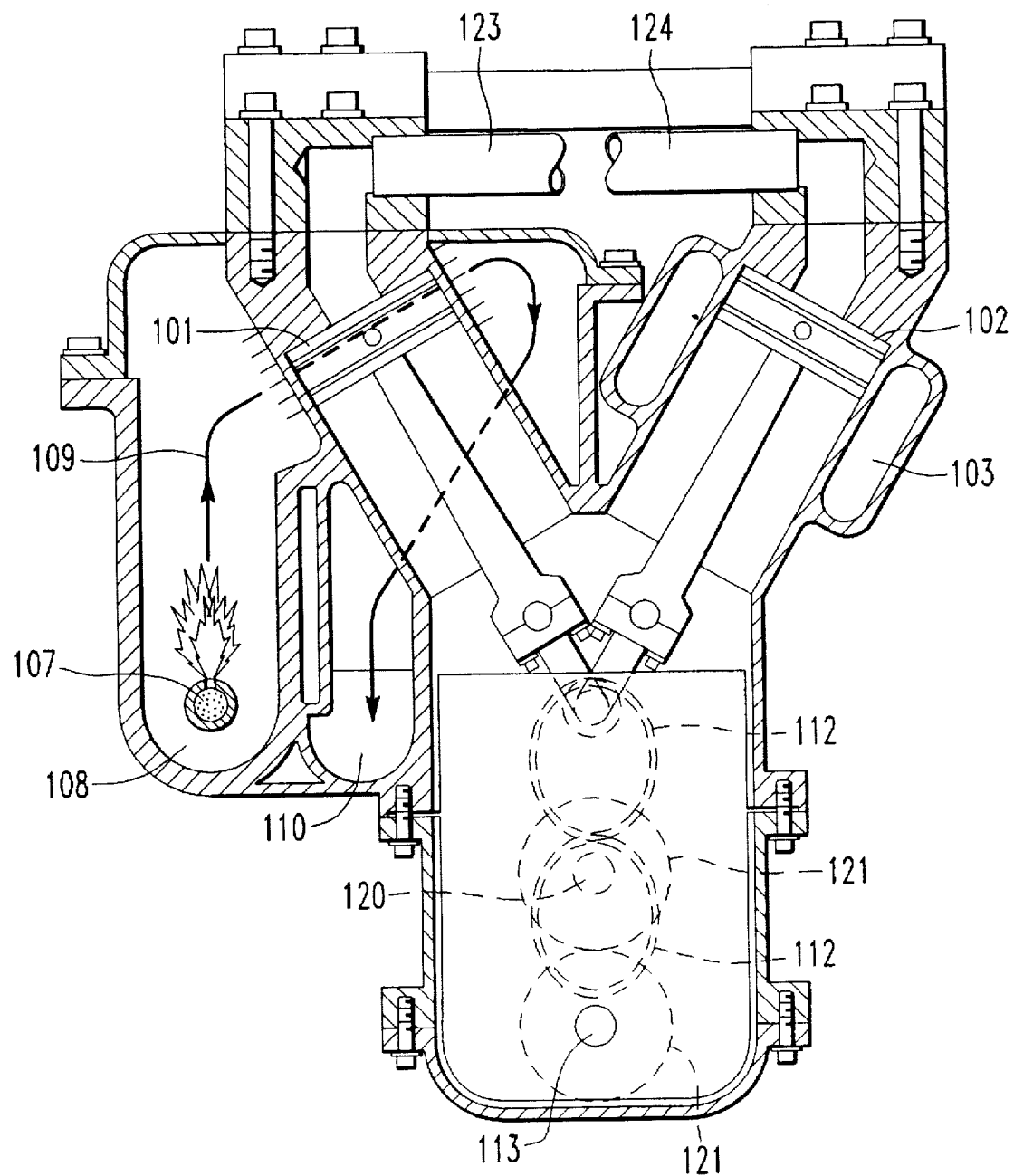
FIG. 13 shows a sectional view of the apparatus of FIG. 12 taken along reference line A—A in FIG. 14.

With reference to both FIGS. 13 and 15, it is noted that the drive shaft 113 is coupled to two countershafts 120 by two pairs of 1:1 spur gears 121. Each countershaft has two elliptical gears attached at each end, (e.g. 112 and 115) which in turn are coupled to their companion elliptical gears on a pair of crankshafts (e.g., 111 and 114 in FIG. 12). Each crankshaft is supported by two bearings 122 on each end.

Depending upon the eccentricity of the elliptical gears, a connecting link (not shown) between the "non-shaft" foci may be used to eliminate any possibility of gear tooth disengagement. If the eccentricity is small and the gear teeth are machined to close tolerances, a connecting link is not required. The arrangement shown in FIG. 12, allows space for such a connecting link if needed. If the connecting links are not used, the need for the 1:1 spur gears and the countershafts is eliminated, and the drive shaft can be connected to the elliptical gears directly.

With reference to FIG. 13 the path 109 provides outflow for the combustion gases. The exhaust manifold 110 is part of the same casting as the air inlet 108. This arrangement allows air flowing into the combustion chamber to be preheated by the exhaust gases, thereby improving fuel efficiency. Also, in FIG. 13, two regenerator tubes 123 and 124 are provided. The regenerator tube 123 runs between the hot cylinder A4 and the cold cylinder B4; similarly, the regenerator tube (124) is connected between the cylinders A1 and B1. FIG. 14 shows the regenerator connections for the other cylinders.

In FIGS. 12 and 14, the flywheel 125 is shown, and apparatus 126 (FIG. 15) includes the following auxiliaries: a fuel pump, a lubrication pump, a generator and a coolant pump.

The following table summarizes the reference characters for the elements of FIG. 12–15:

TABLE I

Figure 16:
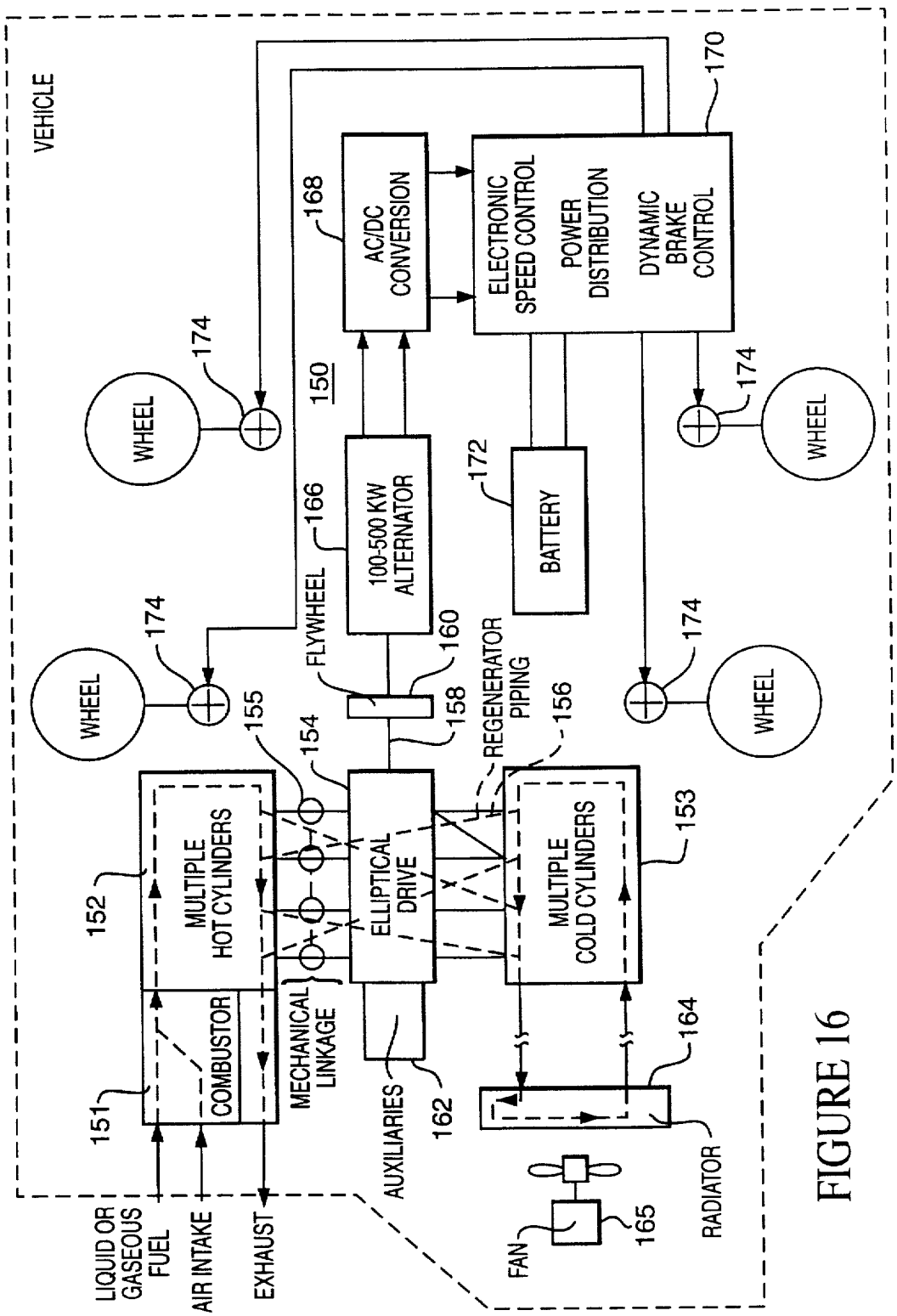
FIGS. 16 and 17 depict block diagrams for a vehicular power plant and a large stationary plant embodying the invention.

101 Hot Cylinder
102 Cold Cylinder
103 Cooling Jacket
104 Radiator
105 Coolant Inlet
106 Coolant Outlet
107 Fuel Intake
108 Air Intake
109 Combustion Gas Path
110 Exhaust Pipe
111 Crankshaft
112 Elliptical Gear Pair
113 Drive Shaft
114 Crankshaft
115 Elliptical Gear Pair
116 Crankshaft
117 Elliptical Gear Pair
118 Crankshaft
119 Elliptical Gear Pair
120 Countershafts
121 Spur Gears
122 Crankshaft & Drive Shaft Bearings
123 Regenerator Tube A4–B4
124 Regenerator Tube A1–B1
125 Flywheel
126 Auxiliaries-Fuel Pump, Lube Pump, Coolant Pump and Generator FIG. 16 shows a block diagram for a preferred vehicular application of the invention, i.e., a Stirling engine Vehicular Power Plant. In a Stirling engine 150, a combustor 151 burns either liquid or gaseous fuels. Air for the combustion is blown into the combustion chamber to establish the correct air/fuel ratio for substantially complete combustion. Hot combustion gases circulate around a set of multiple hot cylinders 152. Pistons (not specifically indicated) in the hot cylinders 152 are connected by mechanical linkage 155 (connecting rods and cranks) to an elliptical drive arrangement 154.

Similarly, cold cylinders 153 are connected in a like manner to the elliptical drive arrangement 154. Dashed lines 156 represent piping connections for regenerators of the Stirling engine 150. A drive shaft 158 from the elliptical drive arrangement 154 is connected to a flywheel 160 and to auxiliaries 162. The latter include a circulating pump (not shown) for radiator 164 and a blower (not shown) for air intake to the combustor 151. The flywheel 160 is coupled to an alternator 166.

The generated electrical energy is converted to DC in an AC/DC converter 168. In turn, the DC output of the converter 168 is applied to an electronic controller 170 which feeds power to a floating battery 172 and to drive motors 174. The electronic controller 170 also controls the vehicle speed, and allows the battery 172 to be charged during deceleration with dynamic braking. The radiator 164 provides cooling for the bank of cold cylinders 153. A fan 165 is used to circulate coolant air through the radiator 164.

Figure 17:
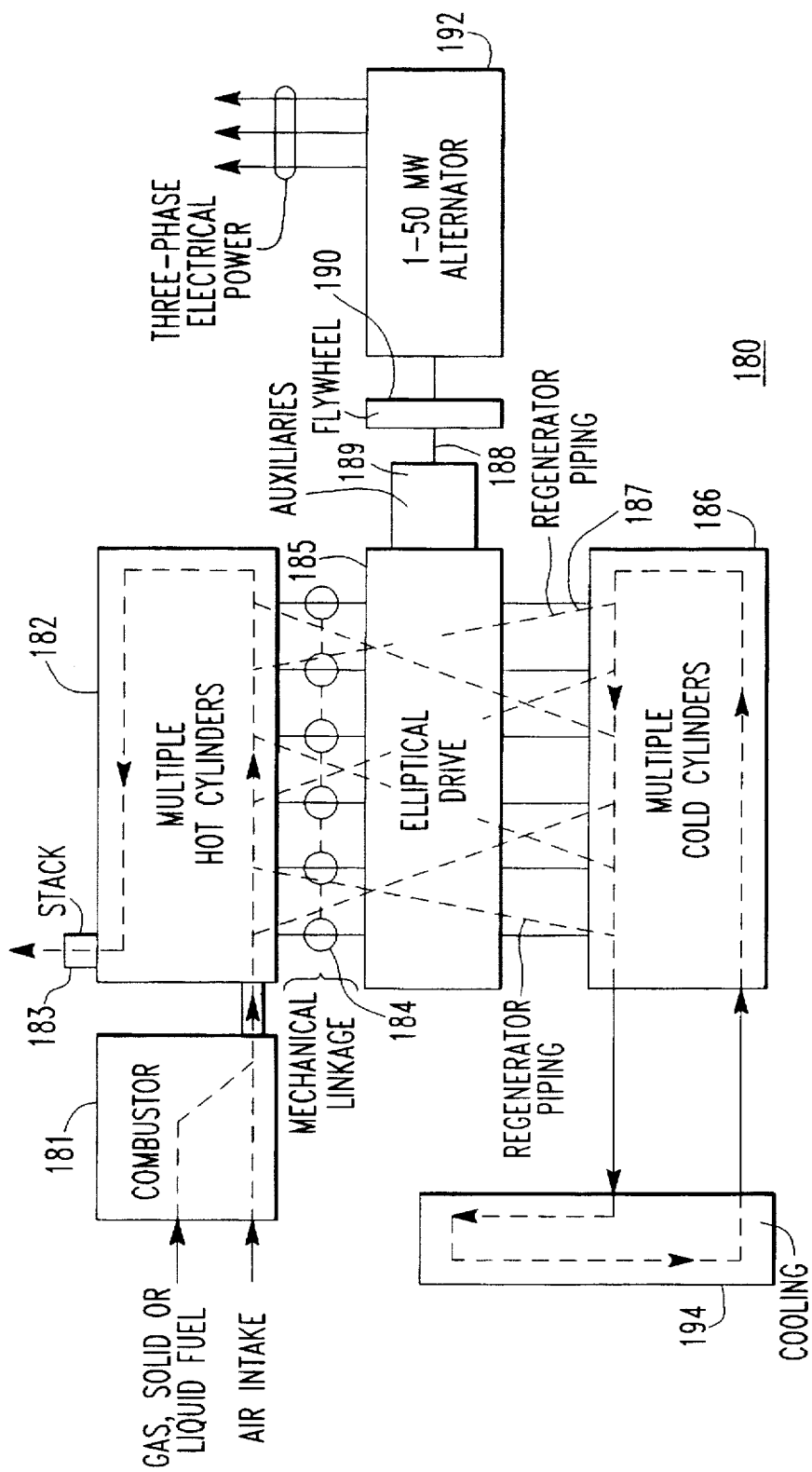

FIG. 17 shows a block diagram for a preferred embodiment of a large stationary power plant 180 employing a Stirling engine in accordance with the invention. A combustor 181 burns solid fuel, liquid fuel, or natural gas. Air for combustion is blown into the combustion chamber with the correct air/fuel ratio for complete combustion. Hot gases circulate around a bank of hot cylinders 182 and then are exhausted through a stack 183. Pistons (not specifically indicated) in the hot cylinders 182 are connected by mechanical linkage 184 (connecting rods and cranks) to an elliptical drive arrangement 185. Similarly, pistons (not specifically indicated) in cold cylinders 186 are connected to the elliptical drive arrangement 185. Dashed lines 187 represent piping connections for the regenerators.

A drive shaft 188 from the elliptical drive arrangement 185 is connected to auxiliaries 189 and a flywheel 190. The auxiliaries 189 include a pump (not shown) for the coolant and a blower (not shown) for the air supply. A drive train from the flywheel 190 powers a large three-phase (such as 1 to 50 megawatt) alternator 192 which supplies energy to a distribution system. The cold cylinders 186 are cooled by circulating coolant around them and through a cooling tower 194.

Figure 18:
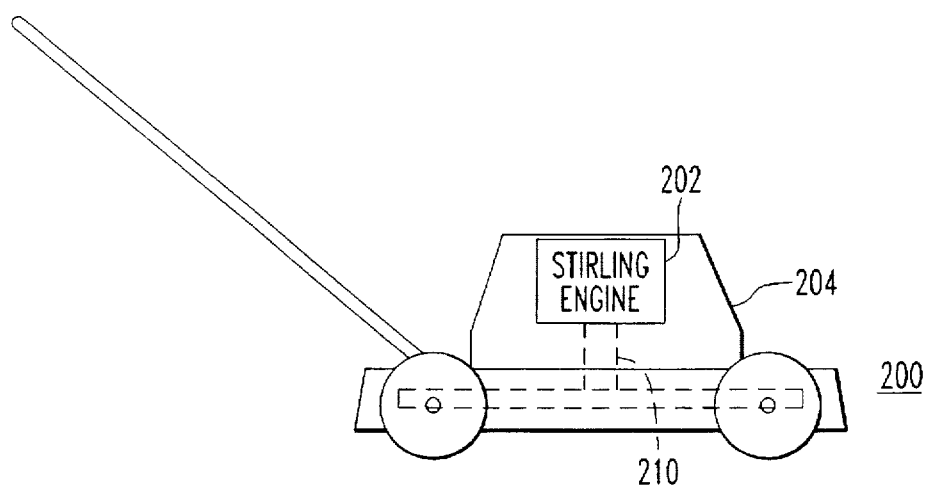
FIGS. 18, 19 and 20 illustrate another Stirling engine embodiment of the invention where the apparatus driven by the engine is a lawn mower.
Figure 19:
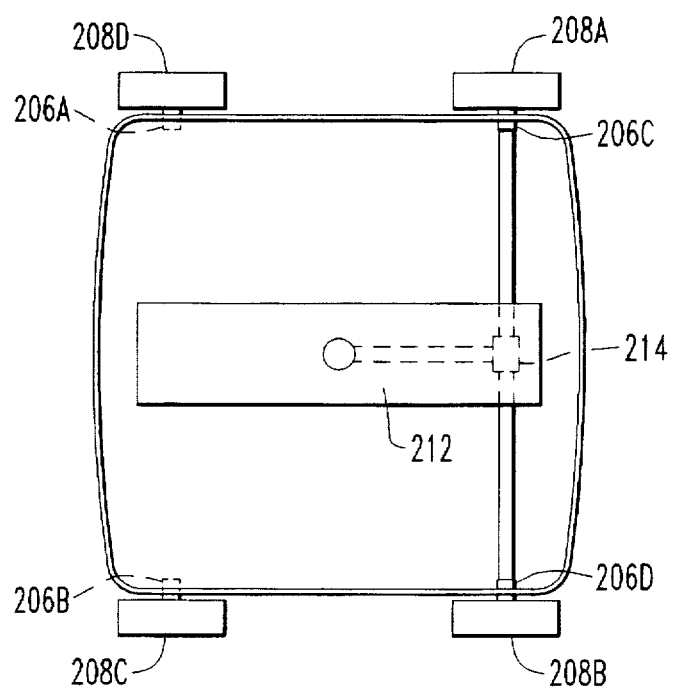
Figure 20:
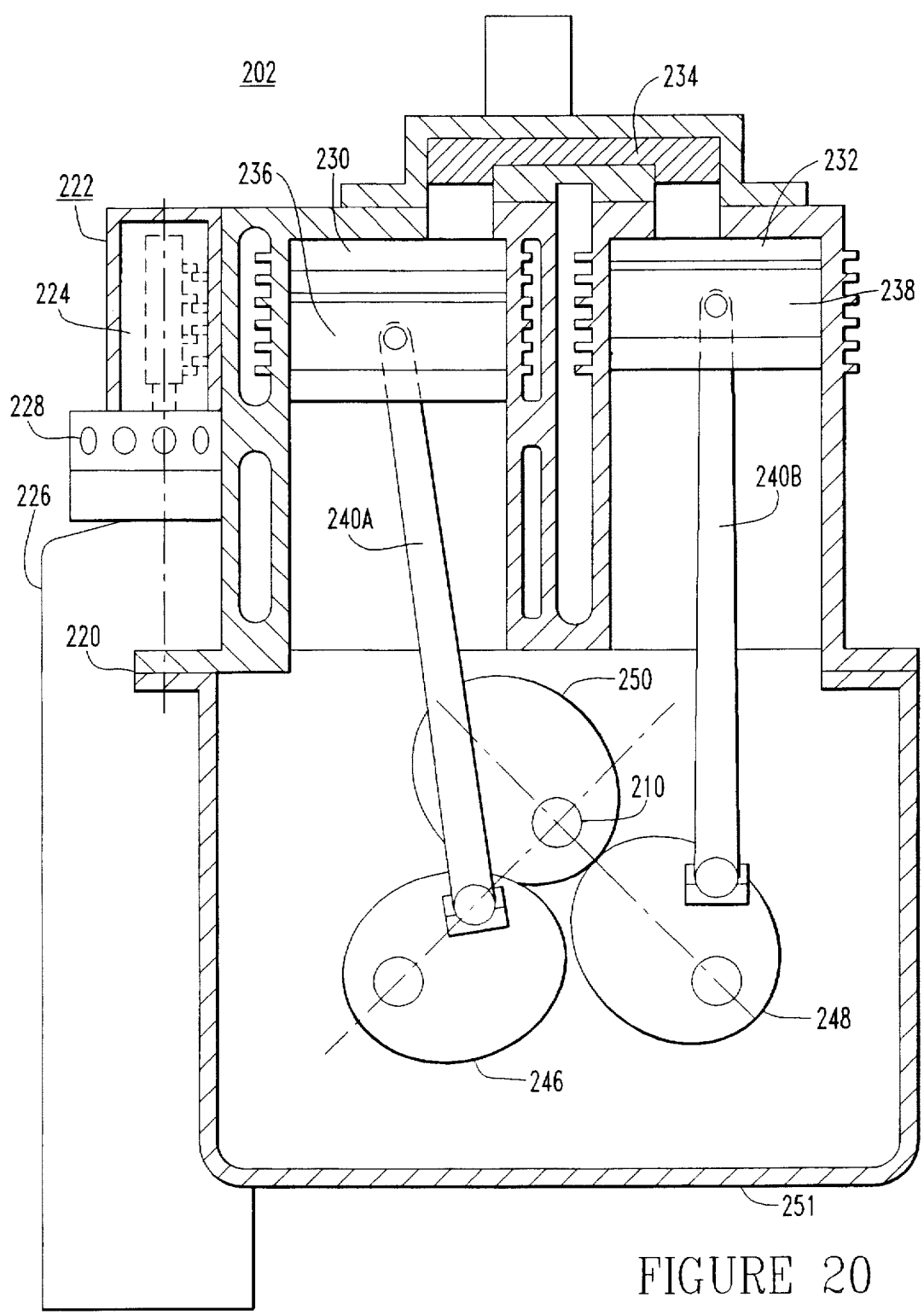

Another Stirling engine embodiment of the invention is shown in FIGS. 18, 19 and 20. In this case, a Stirling engine 202 is employed as a drive for a lawn mower 200.

It is especially beneficial, for a number of reasons, to embody the invention as a lawn mower with efficient Stirling engine operation. First, at the present time in many urban areas, the amount of atmospheric pollution, caused by the operation of lawn mowers having internal combustion engines, is a substantial percentage of the total atmospheric pollution caused by the operation of all internal combustion engines including those of automobiles and trucks. Thus, substantial elimination of atmospheric pollution from lawn mowers through widespread use of Stirling-engine drives would provide a major environmental benefit.

Secondly, Stirling-engine lawn mowers would provide quiet, almost noiseless, lawn cutting thereby providing another environmental benefit through removal of neighborhood noise pollution. Among other benefits, wide use of Stirling-engine lawn mowers would provide the basic Stirling-engine benefit of fuel flexibility.

However, Stirling-engine lawn mowers have not been commercially available for reasons like those described in the Background Section hereof, i.e. especially because of the state-of-the-art inefficiency and large size of Stirling engines and, in contrast, the relative efficiency and small size of internal combustion engines used for lawn mowers. Thus, the invention can be applied to provide a commercially practical, economic, and advantageous Stirling-engine lawn mower not previously realizable.

With reference again to FIGS. 18 and 19, the Stirling engine 202 is supported for operation in a mower housing 204. In turn, the housing 204 is supported relative to axles 206A through 206D having front and rear wheels 208A–208D for mower motion. The engine 202 is coupled through a shaft 210 to a load including a cutting blade 212 which is rotated in a horizontal plane beneath the housing 204.

The output shaft 210 of the Stirling engine 202 may also be coupled to the axles, such as the front axles 206C and 206D through a drive shaft and gearing mechanism 214 to provide powered drive for the lawn mower 200. In any case, the Stirling engine 202 is coupled to the output shaft 210 through an elliptical gear mechanism having Class 1 elliptical gears of the first type and arranged to provide benefits like those described in connection with the Stirling-engine embodiment of FIG. 3.

In the schematic of FIG. 20, a housing 220 of the Stirling engine 202 is partially broken away to illustrate internal engine structure. Thus, the Stirling engine 202 includes a combustor 222 having a combustion chamber 224 and employing a fuel supply 226 preferably in the form of a small bottle of propane. Air inlets 228 supply the oxygen for fuel combustion. A control (not specifically shown) provides state-of-the-art ON/OFF control, fuel flow control, and power drive control (if included).

A hot cylinder 230 is heated by the flame and the products of combustion from the combustor 222. A cold cylinder 232 is coupled to the hot cylinder 230 through a regenerator 234. Heat is removed from the cold cylinder by a fan blowing air through the cold cylinder fins. The hot and cold cylinder castings are separated to minimize inter-cylinder heat flow.

Pistons 236 and 238 within the cylinders 230 and 232 are driven in reciprocating linear motion in accordance with the thermodynamic cycle previously described herein.

Since the fuel is burned continuously, substantially elevated combustion temperatures exist thereby substantially reducing pollutants, such as carbon monoxide and nitrous oxides, in the products of combustion. Since the lawn mower 200 also has the characteristic quietness of operation of a Stirling engine, it is very environment friendly.

Connecting rods 240A and 240B are coupled in an engine output drive path to respective elliptical gears 246 and 248 of an elliptical gear mechanism which is located in a crank case 251. Preferably, the elliptical gears 246 and 248 jointly drive a single output elliptical gear 250. In turn, the output gear 250 drives the vertical output shaft 210 which provides mower cutting action and, if desired mower drive power as previously described. Alternatively, an elliptical gear arrangement like that described in connection with FIG. 3 may be employed within the elliptical gear mechanism.

The 3-elliptical gear drive has several advantages:

a. One less gear is required, thereby reducing frictional losses;

b. The 3-gear arrangement is more compact, thereby reducing size and weight; and c. The more compact arrangement shortens the regenerator path length, thereby reducing aerodynamic friction losses.

Figure 21:
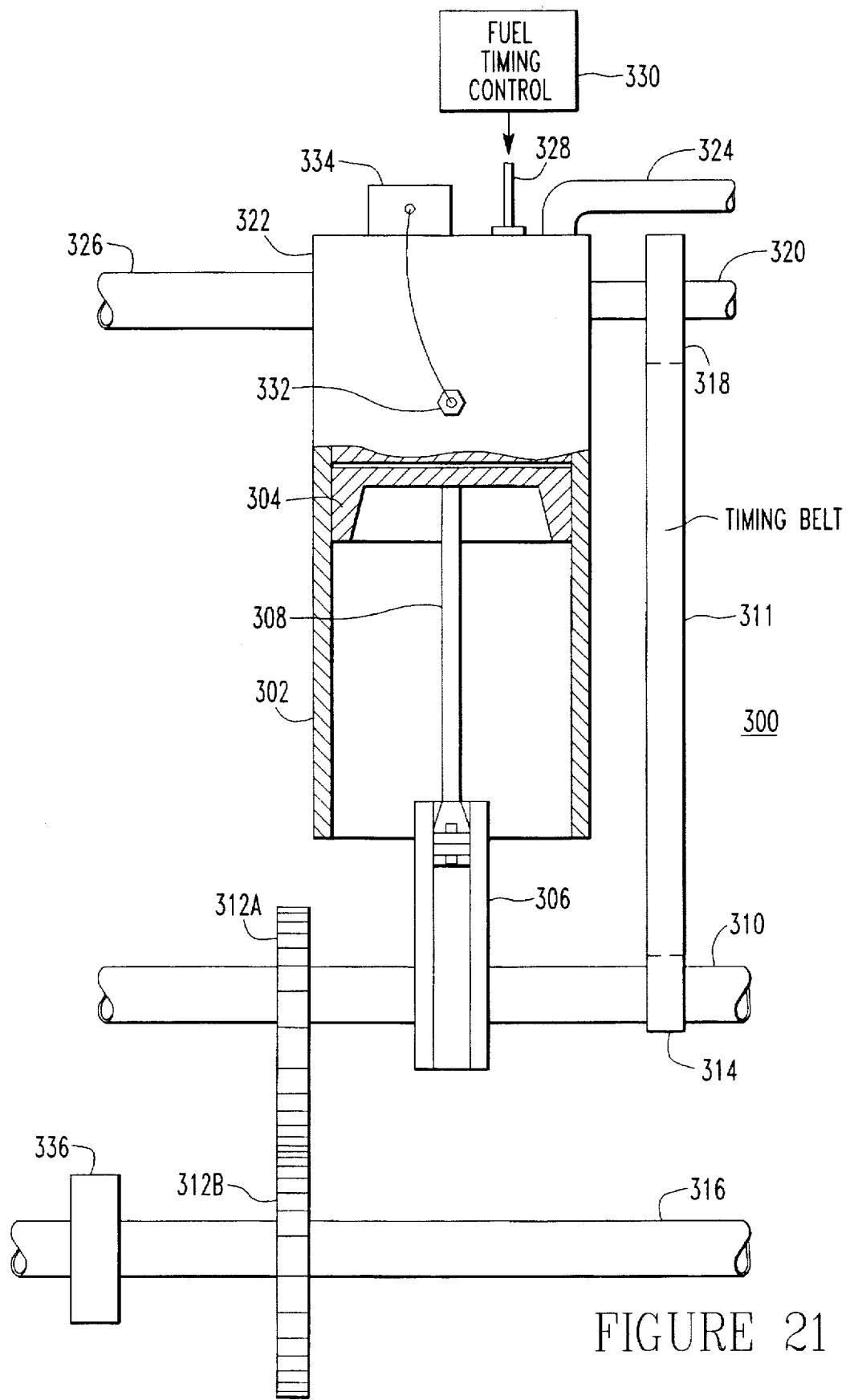
FIG. 21 illustrates a further embodiment of the invention in which an internal combustion engine (partially shown) provides drive power.

An alternate embodiment of the invention is shown in FIG. 21 in which energy conversion apparatus employs an internal combustion engine 300. Only a portion of the engine 300 is shown to simplify the drawing.

The following legend applies to FIG. 21:

LEGEND

302 Cylinder
304 Piston
308 Connecting Rod
306 Crank
310 Crankshaft 312A, 312B Elliptical Gears
316 Drive Shaft
314 Timing Gear
318 Timing Gear
311 Timing Belt
320 Cam Shaft
324 Intake Manifold
328 Fuel Injector
330 Fuel Timing Control
334 Electronic Ignition
322 Valve Chest
326 Exhaust
332 Spark Plug
336 Flywheel A cylinder 302 is one of a predetermined number of engine cylinders, each of which has a piston 304 connected to a crank 306 by a connecting rod 308. In an output drive path, a crankshaft 310 includes the crank(s) 306 and has two gears mounted on it (for each crank). One is an elliptical gear 312A and the other is a timing gear 314.

The elliptical gear 312A on the crankshaft mates with a like elliptical gear 312B on a drive shaft 316 which provides the drive path output. Both gears 312A and 312B are Class 1 elliptical gears of the first type.

The timing gear 314 on the crankshaft 310 drives a timing belt 311 which, in turn, drives a timing gear 318 on a camshaft 320. In turn, the camshaft 320 controls the operation of intake and exhaust valves (not specifically shown) provided in a valve chest 322 for the cylinder 302. An intake manifold 324 supplies air for combustion. Products of combustion are exhausted through an exhaust pipe 326.

Fuel is supplied through an injector 328. Timing for fuel injection is controlled; by a conventional electronic module 330 structured for this purpose.

Ignition is provided by a spark plug 332. A conventional electronic ignition module 334 applies high ignition voltage to the spark plug 332 and controls ignition timing.

The drive shaft runs essentially at a constant angular velocity. Due to the elliptical gear coupling with the crankshaft 310, the latter runs at a variable speed. The phasing of the elliptical gearing 312A and 312B preferably is such that the crankshaft angular velocity is the lowest when the piston 304 is at top dead center; conversely, the angular velocity is preferably the highest when the piston 304 is at the bottom of its stroke.

The torque supplied to the crankshaft 310 during adiabatic expansion peaks after ignition when the crankshaft 310 has turned 20 to 30 degrees. After this peak, the torque falls off very rapidly and reaches zero at 180 degrees.

During the adiabatic compression portion of the cycle, a flywheel 336 supplies negative torque to the crankshaft 310. This energy is supplied to the flywheel 336 during expansion, and, conversely, is extracted from the flywheel 336 during compression.

In conventional internal combustion engines, a heavy flywheel is needed to level out torque changes. With the elliptical gearing 312A and 312B, the torque (positive and negative) supplied to the drive shaft 316 is leveled out and becomes almost sinusoidal. With a multi-cylinder engine (i.e., 8 cylinders), the torque supplied to the drive shaft 316 is positive over the whole cycle with relatively small variations. As a consequence, the invention as applied in this embodiment provides a number of advantages which are considered subsequently.

Figure 22:
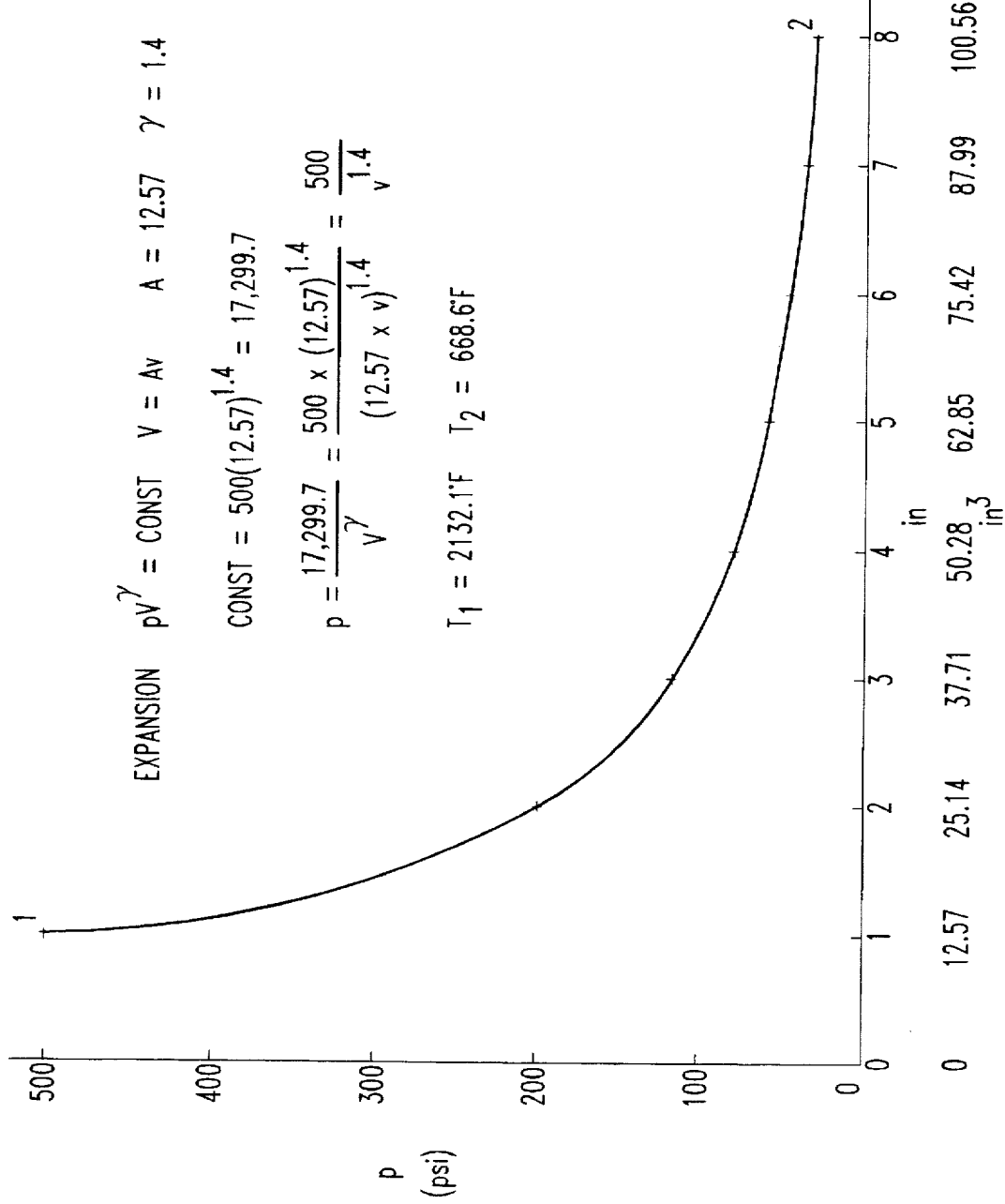
FIGS. 22–27 show various graphs which illustrate advantages of the embodiment of FIG. 21.
Figure 23:
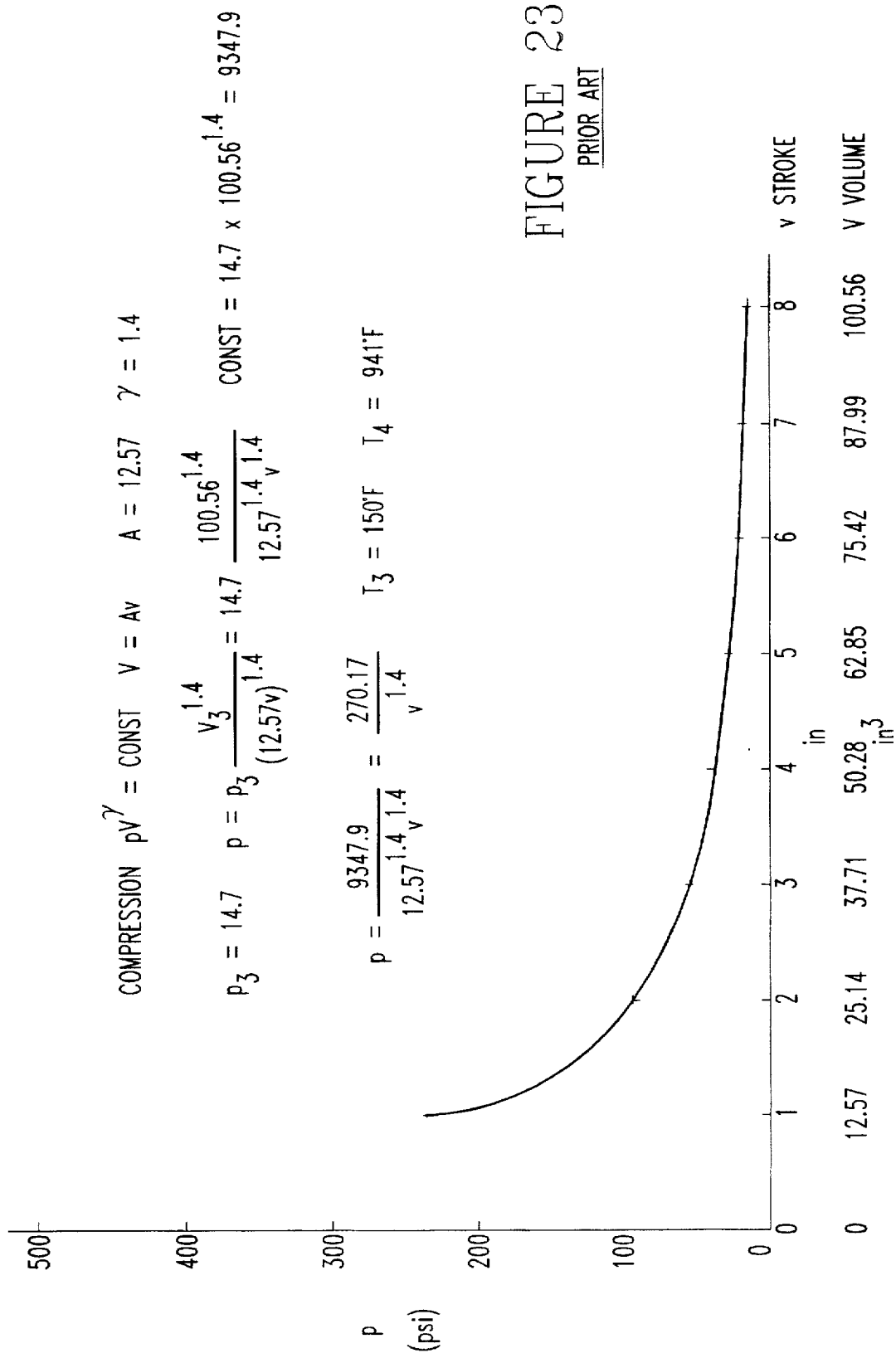
Figure 24:
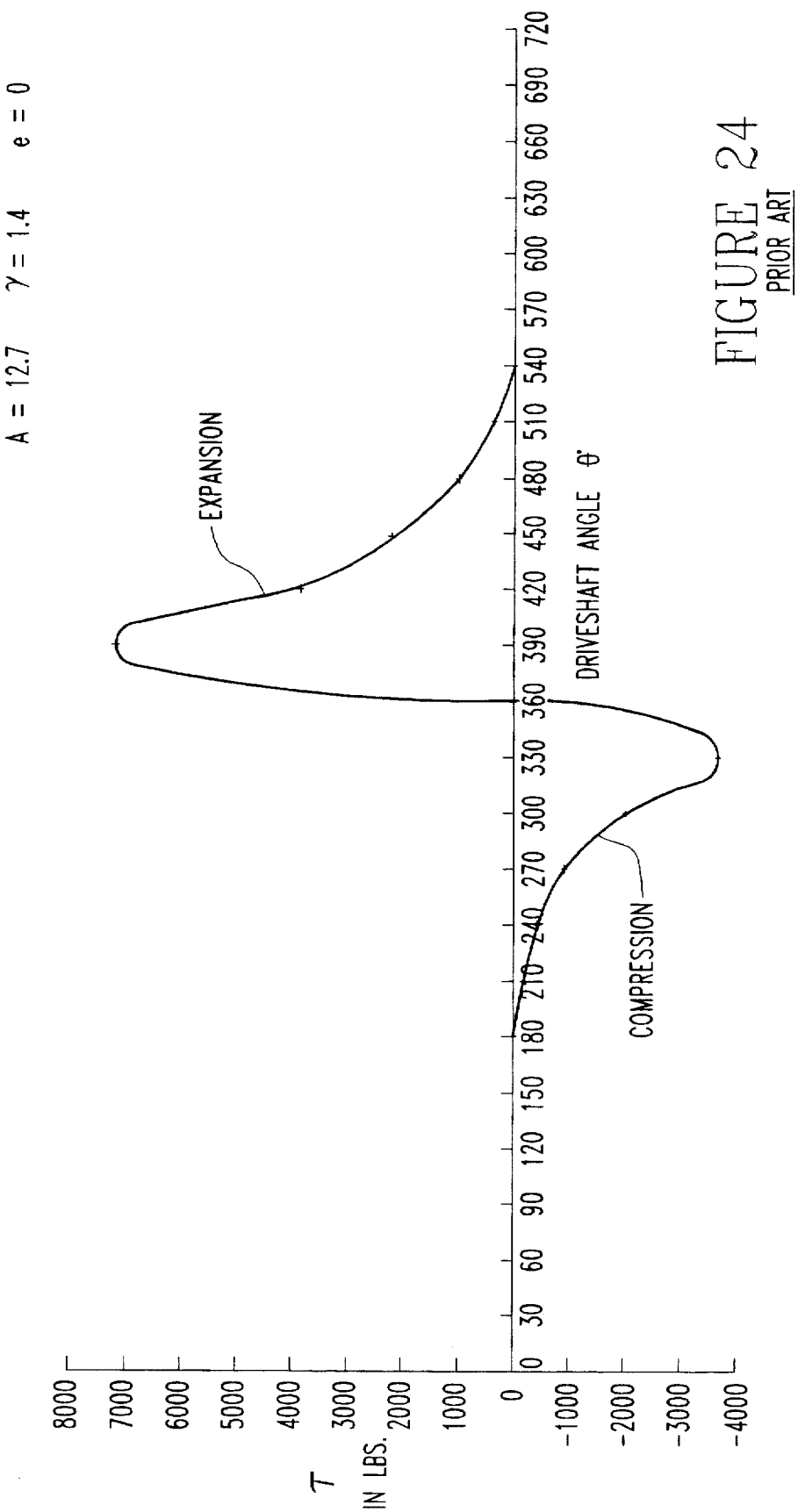

During the adiabatic expansion phase in a conventional internal combustion engine, the pressure vs. displacement curve is shown in FIG. 22. A similar curve for compression is shown in FIG. 23. FIG. 24 shows the torque developed during expansion (the positive portion) as a function of crankshaft angle. The negative portion is the torque required for compression.

Figure 25:
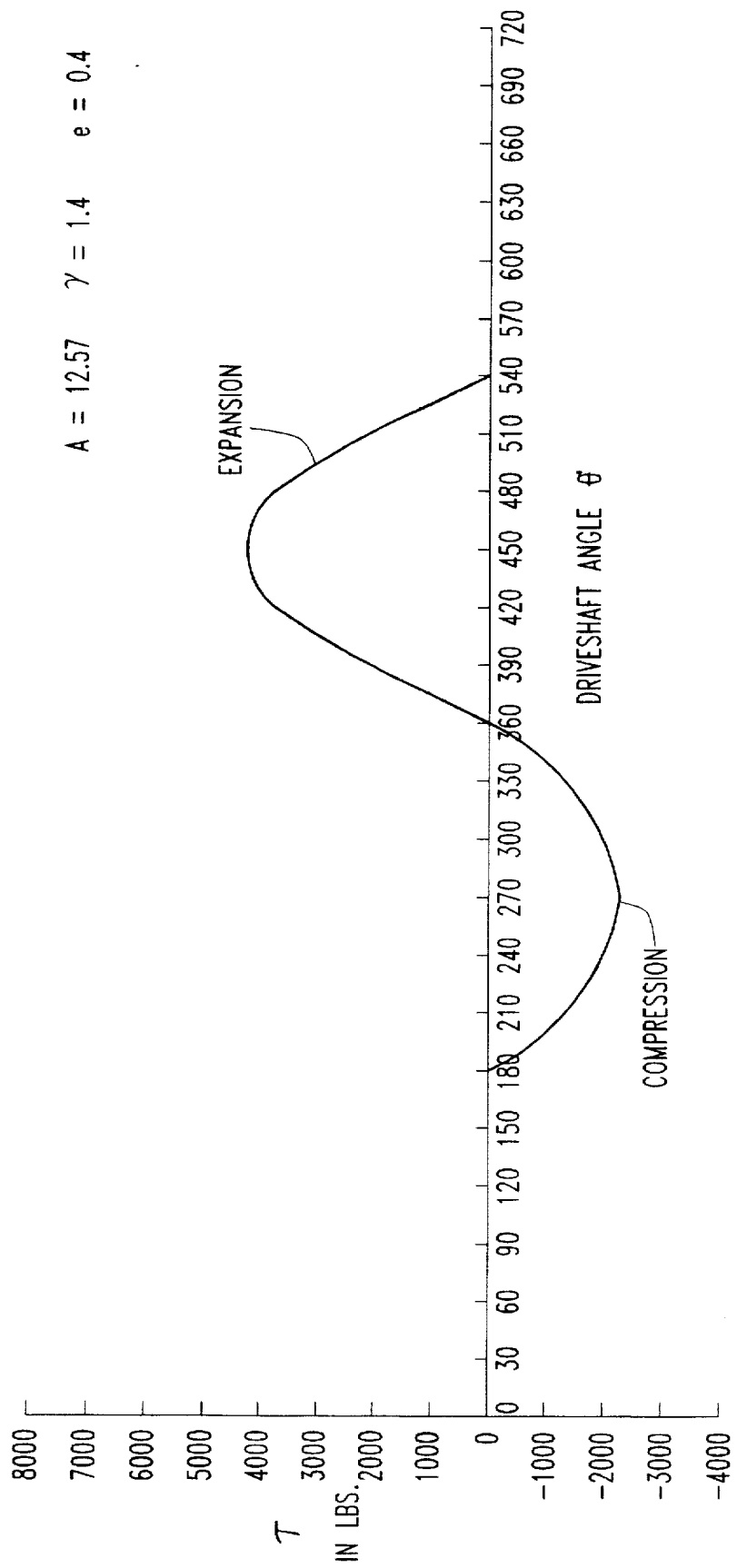

FIG. 25 is a curve for a comparable engine with elliptical gears (e=0.4) interposed between the crankshaft and the drive shaft. As shown, the elliptical gearing makes the torque curve more sinusoidal. To find the net torque delivered to the crankshaft or to the drive shaft, the negative portion must be subtracted from the positive portion. Energy from the expansion is stored in the flywheel; energy for compression is extracted from the flywheel. The energy difference is that which is available for useful work.

Figure 26:
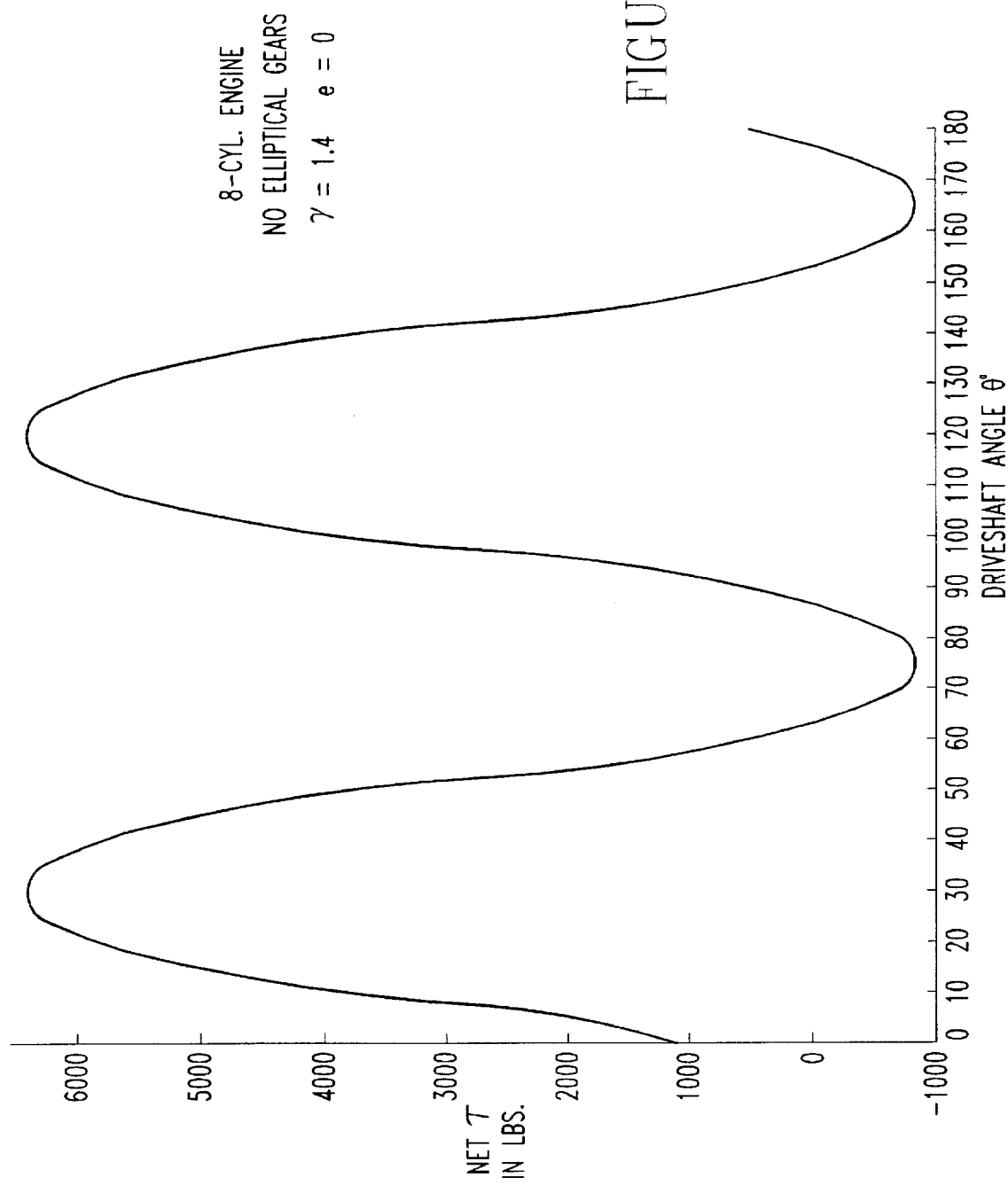
Figure 27:
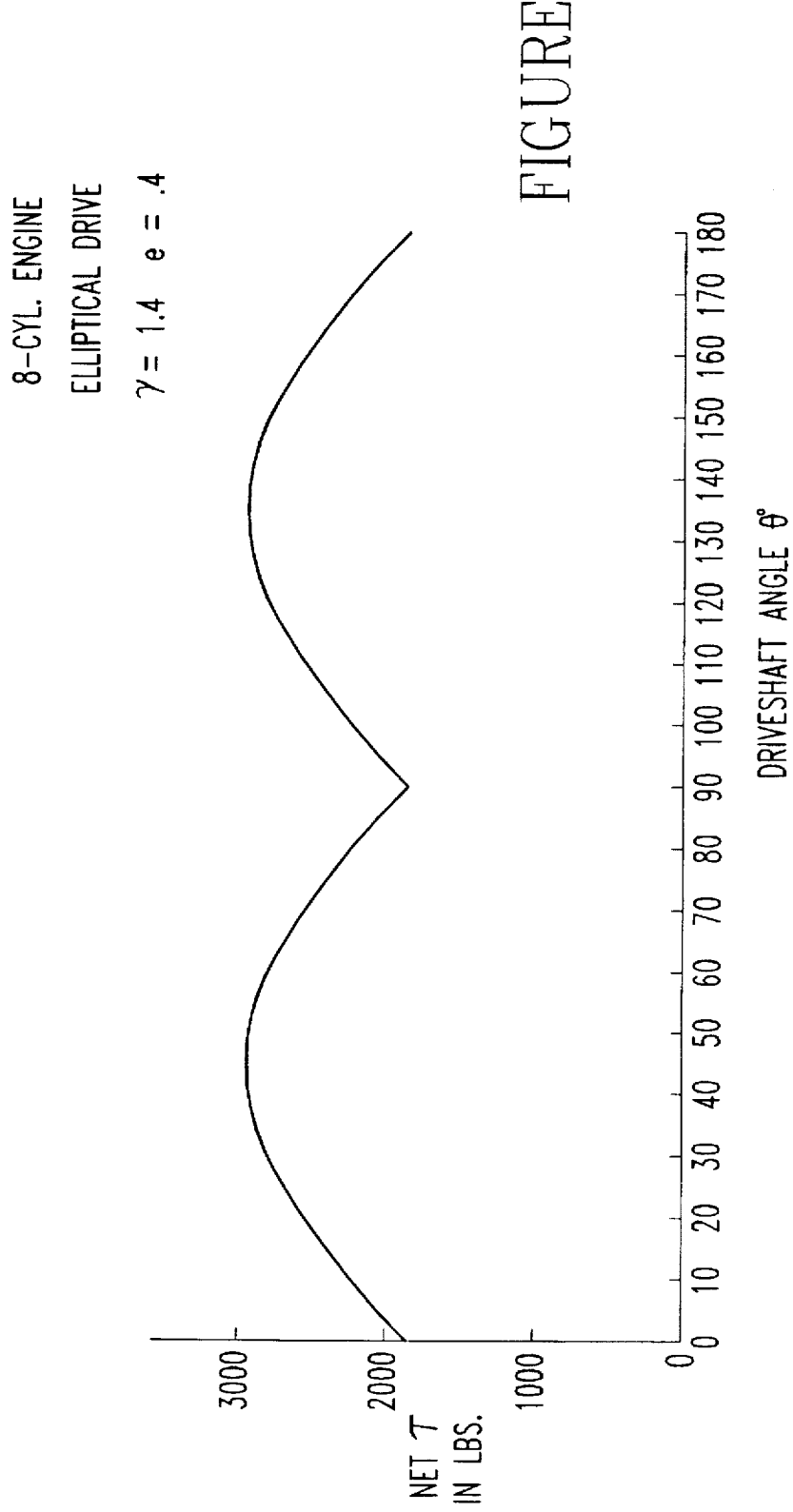

FIG. 26 shows the net torque developed for an eight-cylinder engine without elliptical gearing. Even with eight cylinders, note that there are still negative torque excursions. FIG. 27 shows a similar curve representing an engine with the elliptical gearing. The torque curve of FIG. 27 is now flatter without negative excursions.

Application of elliptical gearing in accordance with the invention results in the following engine improvements:

a. The weight of the flywheel can be greatly reduced without impairing the smoothness of the engine.

b. The weight of the engine can be reduced with the lighter flywheel. As a consequence, the vehicle can carry more payload.

c. Engine responsiveness is improved during acceleration with the lighter flywheel. This provides some improvement in fuel economy.

d. With the described application of elliptical gearing, the piston advance as a function of drive shaft angle is slower during the combustion phase. Thus, the piston stays near top dead center for a longer period of time after ignition (as a function of total cycle time). As a result, combustion takes place for a longer period of time at high temperature and high pressure. This is an advantage since the combustion is more complete with substantially lower percentages of carbon monoxide and other hydrocarbons, generated as products of combustion, thereby reducing pollution.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A drive apparatus comprising:

an engine having one or more cylinders, each cylinder having a moveable piston contained therein;

a system for generating heat and for converting the heat into linear motion of the piston within each cylinder;

a load;

a drive system having a mechanical drive path through which the piston of each cylinder is coupled to the load to apply driving force thereto;

the drive system including a drive shaft in the drive path; and gear mechanism means connected between the piston of each cylinder and the drive shaft and having at least a set of Class 1 elliptical gears of the first type to increase efficiency of the engine and overall efficiency of the apparatus.

2. The apparatus of claim 1 wherein:

the engine is an internal combustion engine;

the heat generating and converting system includes a system for supplying fuel and air to each cylinder for combustion therein; and a flywheel is coupled to the drive shaft.

3. The apparatus of claim 1, wherein:

the engine is a Stirling engine having one or more pairs of the cylinders, and the generating and converting system includes:

- a system for heating a first cylinder of each pair of cylinders to heat gas entrapped therein;
- a system for cooling a second cylinder of each pair of cylinders to cool gas entrapped therein;
- a regenerator connected between the first and second cylinders of each pair of cylinders to absorb heat from the entrapped gas when piston motion causes movement of the gas in one direction from the first cylinder to the second cylinder and to transfer heat to the entrapped gas when piston motion causes the gas to move in a direction opposite to the one direction.

4. The apparatus of claim 3 wherein:

the gear mechanism means includes a gear mechanism connected between the drive shaft and each of first and second pistons of the respective cylinders in each cylinder pair, each gear mechanism having a set of Class 1 elliptical gears of the first type;

respective crankshafts are coupled to respective rods of the first and second pistons of each cylinder pair to convert linear piston motion to rotary crankshaft motion; and each set of Class 1 elliptical gears of the first type couples the associated crankshaft to the drive shaft.

5. An apparatus having a Stirling engine drive comprising:

at least a pair of cylinders having respective moveable pistons contained therein;

a system for heating a first cylinder of the pair of cylinders to heat gas entrapped therein;

a system for cooling a second cylinder of the pair of cylinders to cool gas entrapped therein;

a regenerator connected between the first and second cylinders to absorb heat from the entrapped gas when piston motion causes movement of the gas in one direction from the first cylinder to the second cylinder and to transfer heat to the gas when piston motion causes the gas to move in a direction opposite to the one direction;

a load;

a drive system having a mechanical drive path through which each piston is coupled to the load to apply driving force thereto;

the drive system including a drive shaft; and gear mechanism means connected between the pistons and the drive shaft and having at least a set of Class 1 elliptical gears of the first type to increase the thermodynamic efficiency of the Stirling engine and the overall efficiency of the apparatus.

6. The apparatus of claim 5 wherein:

the gear mechanism means includes a gear mechanism connected between each piston and the drive shaft, and each gear mechanism has a set of Class 1 elliptical gears of the first type;

each gear mechanism includes a crankshaft coupled to a rod of the associated piston to convert linear piston motion to rotary crankshaft motion; and each set of Class 1 elliptical gears of the first type couples the associated crankshaft to the drive shaft.

7. The apparatus of claim 6 wherein a crankshaft angle for a first piston is related to a rotation angle of the drive shaft as follows:

$$\sin \theta_2 = \frac{(1 - e^2) \sin \theta_0}{(1 + e^2 + 2e \cos \theta_0)}$$

where $\theta_0$ is the drive shaft angle and $\theta_2$ is the crankshaft angle.

8. The apparatus of claim 6 wherein:

a connecting rod, having a length l, couples each piston to its associated crankshaft and each crankshaft has a throw t; and cylinder displacement V is related to crankshaft angle $\theta_2$ as follows:

$$V = A \left[ l + t(1 - \cos \theta_2) - \sqrt{l^2 - t^2 \sin^2 \theta_2} \right].$$

9. The apparatus of claim 5 wherein the heating system is a combustion system which is configured in accordance with whether input fuel is gaseous, liquid, or solid.

10. The apparatus of claim 9 wherein:

the combustion system has a control system which controls fuel flow into the combustion system to meet an input load demand with a fuel air ratio which enables essentially complete combustion of the fuel.

11. The apparatus of claim 5 wherein a flywheel is provided for the drive shaft.

12. The apparatus of claim 5 wherein the load is a generator to which an electrical load is coupled.

13. The apparatus of claim 5 wherein the load is a mechanical load driven by drive gearing coupling the load to the drive shaft.

14. The apparatus of claim 5 wherein the apparatus is mobile and wherein:

a plurality of system pairs of cylinders with associated pistons and heating and cooling systems and regenerators are provided to form a drive unit; and respective gear mechanisms are provided for coupling the piston of each cylinder of each cylinder pair to the drive shaft.

15. The apparatus of claim 14 wherein:

the mobile apparatus is a vehicle having a plurality of wheels of which at least some are driven by respective electric motors; and the load is at least one electric generator that powers the electric motors.

16. The apparatus of claim 14 wherein:

the mobile apparatus is a vehicle having a plurality of wheels of which at least some are driven by a mechanical drive coupled to the drive shaft.

17. The apparatus of claim 5 wherein:

the load is a stationary electric generator which provides electric power for a power generating system;

a plurality of pairs of cylinders with associated pistons and heating and cooling systems and regenerators are interconnected; and respective gear mechanisms are provided for coupling the piston of each cylinder of each cylinder pair to the drive shaft.

18. The apparatus of claim 5 wherein:

the apparatus is a lawn mower having a housing; a system for supporting the Stirling engine drive in relation to the housing;

and a cutting blade coupled to the drive shaft through the gear mechanism means and supported for rotation in a substantially horizontal plane to constitute at least a portion of the load.

19. The lawn mower of claim 18 further comprising:

a plurality of wheels of which at least some are coupled to the drive shaft to constitute at least another portion of the load.

20. The apparatus of claim 3 wherein:

the gear mechanism means includes, for each pair of cylinders, first and second elliptical gears coupled to respective rods of first and second pistons of respective cylinders in each cylinder pair, and a third elliptical gear coupling the first and second elliptical gears to the drive shaft; and each of the first, second and third elliptical gears being a Class I elliptical gear of the first type.

21. The apparatus of claim 20 wherein:

the apparatus is a lawn mower having a housing; a system for supporting the Stirling engine drive in relation to the housing; and a cutting blade coupled to the drive shaft through the gear mechanism means and supported for rotation in a substantially horizontal plane to constitute at least a portion of the load.

22. An apparatus for driving a load comprising:

an engine having one or more cylinders, each cylinder having a moveable piston contained therein;

a system for generating heat and for converting the heat into linear motion of the piston within each cylinder;

a drive system having a mechanical drive path through which the piston of each cylinder applies driving force to a load;

the drive system including a drive shaft in the drive path; and gear mechanism means connected between the piston of each cylinder and the drive shaft and having at least a set of Class 1 elliptical gears of the first type to increase efficiency of the engine and the overall efficiency of the apparatus.

23. The apparatus of claim 22 wherein:

the engine is an internal combustion engine;

the heat generating and converting system includes a system for supplying fuel and air to each cylinder for combustion therein; and a flywheel is coupled to the drive shaft.

24. The apparatus of claim 22 whereas:

the engine is a Stirling engine having one or more pairs of the cylinders, and the generating and converting system includes:

a system for heating a first cylinder of each pair of cylinders to heat gas entrapped therein;

a system for cooling a second cylinder of each pair of cylinders cool gas entrapped therein;

a regenerator connected between the first and second cylinders of each pair of cylinders to absorb heat from the entrapped gas when piston motion causes movement of the gas in one direction from the first cylinder to the second cylinder and to transfer heat to the entrapped gas when piston motion causes the gas to move in a direction opposite to the one direction.

25. The apparatus of claim 24 wherein:

the gear mechanism means including a gear mechanism connected between the drive shaft and each of first and second pistons of the cylinders in each cylinder pair, each gear mechanism having a set of Class 1 elliptical gears of the first type;

respective crankshafts are coupled to respective rods of the first and second pistons of each cylinder pair to convert linear piston motion to rotary crankshaft motion; and each set of Class 1 elliptical gears of the first type couples the associated crankshaft to the drive shaft.

26. A Stirling engine apparatus for driving a load comprising:

at least a pair of cylinders having respective moveable pistons contained therein;

a system for heating a first cylinder of the pair of cylinders to heat gas entrapped therein;

a system for cooling a second cylinder of the pair of cylinders to cool gas entrapped therein;

a regenerator connected between the first and second cylinders to absorb heat frown the entrapped gas when piston motion causes movement of the gas in one direction from the first cylinder to the second cylinder and to transfer heat to the gas when piston motion causes the gas to move in a direction opposite to the one direction;

a drive system having a mechanical drive path through which each piston is coupled to the load to apply driving force thereto;

the drive system including a drive shaft; and gear mechanism means connected between the pistons and the drive shaft and having at least a set of Class 1 elliptical gears of the first type to increase the thermodynamic efficiency of the Stirling engine and the overall efficiency of the apparatus.

27. The engine apparatus of claim 26 wherein:

the gear mechanism means includes a gear mechanism connected between each piston and the drive shaft, and each gear mechanism has a set of Class 1 elliptical gears of the first type;

each gear mechanism includes a crankshaft coupled to a rod of the associated piston to convert linear piston motion to rotary crankshaft motion; and each set of Class 1 elliptical gears of the first type couples the associated crankshaft to the drive shaft.

28. The engine apparatus of claim 26 wherein the heating system produces heat through fuel combustion; and wherein the heating system includes:

an electronic control system which controls fuel flow in the heating system to meet an engine load demand with a fuel air ratio which enables essentially complete combustion of the fuel.

29. The apparatus of claim 26 wherein the apparatus is configured to drive a lawn mower.

30. The apparatus of claim 26 wherein the apparatus is configured to drive a vehicle.

31. The apparatus of claim 30 wherein:

the gear mechanism means includes, for each pair of cylinders first and second elliptical gears coupled to respective rods of first and second pistons of respective cylinders in each cylinder pair, and a third elliptical gear coupling the first and second elliptical gears to the drive shaft; and each of the first, second and third elliptical gears being a Class I elliptical gear of the first type.

* * * * *

UNITED STATES PATENT AND TRADEMARK OFFICE
CERTIFICATE OF CORRECTION

PATENT NO. : 5,557,934

DATED : September 24, 1996

INVENTOR(S) : Eugene H. Beach

It is certified that error appears in the above-identified patent and that said Letters Patent is hereby corrected as shown below:

Claim 16, column 18, line 50, "apparatus;of" should read --apparatus of--.

Claim 24, column 19, line 55, after "cylinders", insert --to--.

Signed and Sealed this

Tenth Day of December, 1996

Attest:

BRUCE LEHMAN

*Attesting Officer*     *Commissioner of Patents and Trademarks*